United States Patent
Chen et al.

(10) Patent No.: US 10,673,586 B2
(45) Date of Patent: Jun. 2, 2020

(54) DOWNLINK PILOT TRANSMITTING METHOD AND DEVICE, DETECTION METHOD AND DEVICE, EVOLVED NODE B AND TERMINAL

(71) Applicant: ZTE Corporation, Shenzhen (CN)

(72) Inventors: Yijian Chen, Shenzhen (CN); Zhaohua Lu, Shenzhen (CN); Yu Ngok Li, Shenzhen (CN); Guanghui Yu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 185 days.

(21) Appl. No.: 15/511,339

(22) PCT Filed: May 13, 2015

(86) PCT No.: PCT/CN2015/078895
§ 371 (c)(1),
(2) Date: Mar. 15, 2017

(87) PCT Pub. No.: WO2016/041368
PCT Pub. Date: Mar. 24, 2016

(65) Prior Publication Data
US 2017/0264412 A1 Sep. 14, 2017

(30) Foreign Application Priority Data
Sep. 15, 2014 (CN) .......................... 2014 1 0468890

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 5/005* (2013.01);
(Continued)

(58) Field of Classification Search
CPC ........... H04W 72/042; H04W 72/0446; H04W 88/08; H04W 88/02; H04L 5/0048;
(Continued)

(56) References Cited

U.S. PATENT DOCUMENTS

| 9,826,546 B2* | 11/2017 | Li ......................... H04L 1/0026 |
| 2010/0246559 A1* | 9/2010 | Ogawa .................. H04L 5/0007 370/345 |

(Continued)

FOREIGN PATENT DOCUMENTS

| CN | 102055709 A | 5/2011 |
| CN | 102263723 A | 11/2011 |

(Continued)

OTHER PUBLICATIONS

International Search Report for corresponding application PCT/CN2015/078895 filed on May 13, 2015; dated Jul. 22, 2015.
(Continued)

*Primary Examiner* — Will W Lin
(74) *Attorney, Agent, or Firm* — Cantor Colburn LLP

(57) ABSTRACT

A downlink pilot transmitting method and device, a downlink pilot detecting method and device, a terminal and an evolved Node B are provided. In the transmitting method, the evolved Node B divides resources for transmitting a downlink Channel State Information-Reference Signal (CSI-RS) into multiple resource groups, wherein the resources include any one or any combination of subframes, ports and Physical Resource Block (PRB) pairs; the evolved Node B respectively configures a pilot transmitting parameter of each resource group and/or respectively reaches an
(Continued)

agreement with the terminal on the a pilot transmitting parameter of each resource group; and the evolved Node B respectively transmits the downlink CSI-RS in the multiple resource groups according to the pilot transmitting parameter configured and/or as agreed with the terminal for each resource group.

18 Claims, 8 Drawing Sheets

(51) Int. Cl.
*H04W 72/04* (2009.01)
*H04W 88/02* (2009.01)
*H04W 88/08* (2009.01)

(52) U.S. Cl.
CPC ......... *H04L 5/0091* (2013.01); *H04W 72/042* (2013.01); *H04W 72/0446* (2013.01); *H04L 5/0023* (2013.01); *H04W 88/02* (2013.01); *H04W 88/08* (2013.01)

(58) Field of Classification Search
CPC ..... H04L 5/0023; H04L 5/0091; H04L 5/005; H04B 7/0626
See application file for complete search history.

(56) References Cited

U.S. PATENT DOCUMENTS

| | | | | |
|---|---|---|---|---|
| 2011/0194551 A1* | 8/2011 | Lee | ...................... | H04B 7/0626 370/342 |
| 2012/0058791 A1* | 3/2012 | Bhattad | ................ | H04L 1/0606 455/509 |
| 2012/0076106 A1* | 3/2012 | Bhattad | ................ | H04L 5/0035 370/330 |
| 2014/0198675 A1* | 7/2014 | He | ........................ | H04L 5/0048 370/252 |
| 2014/0286232 A1* | 9/2014 | Kim | ...................... | H04B 7/0413 370/315 |
| 2014/0286288 A1* | 9/2014 | Park | ...................... | H04W 72/14 370/329 |
| 2015/0003442 A1* | 1/2015 | Sun | ........................ | H04W 16/02 370/350 |
| 2015/0063287 A1* | 3/2015 | Mazzarese | ............ | H04W 24/10 370/329 |
| 2015/0078271 A1* | 3/2015 | Kim | ...................... | H04B 7/0417 370/329 |
| 2015/0230259 A1* | 8/2015 | Park | ...................... | H04B 7/0626 370/329 |
| 2017/0063436 A1* | 3/2017 | Li | ........................ | H04W 24/10 |
| 2018/0317209 A1* | 11/2018 | Guan | ................ | H04W 72/1278 |

FOREIGN PATENT DOCUMENTS

| | | |
|---|---|---|
| CN | 102308490 A | 1/2012 |
| CN | 103297153 A | 9/2013 |
| CN | 103313250 A | 9/2013 |
| CN | 103391576 A | 11/2013 |
| CN | 103460749 A | 12/2013 |
| EP | 2696618 A1 | 2/2014 |
| WO | 2011120224 A1 | 10/2011 |
| WO | 2011153286 A1 | 12/2011 |
| WO | 2013069664 A1 | 5/2013 |
| WO | 2014010994 A1 | 1/2014 |
| WO | 2014042422 A2 | 3/2014 |

OTHER PUBLICATIONS

European Search Report for corresponding application EP15842269; Report dated Aug. 17, 2017.

* cited by examiner

DOWNLINK PILOT TRANSMITTING METHOD AND DEVICE, DETECTION METHOD AND DEVICE, EVOLVED NODE B AND TERMINAL

TECHNICAL FIELD

The present disclosure relates to the technical field of downlink pilot transmitting and detection, and more particularly to a downlink pilot transmitting method and device, a downlink pilot detecting method and device, an evolved Node B and a terminal in the field of radio communications.

BACKGROUND

In a radio communication system, a transmitter may usually adopt multiple antennae to acquire a higher transmission rate. Multiple antennae may increase a signal to noise ratio and support a larger number of spatial multiplexing layers. Compared with an open-loop Multi-input Multi-output (MIMO) technology in which a transmitter does not use Channel State Information (CSI), a MIMO technology (closed-loop MIMO precoding) using CSI information can achieve higher capacity, and is a widely used transmission technology of a current mainstream 4th-Generation (4G) standard. A core concept of the closed-loop MIMO precoding technology is that a receiver feeds back channel information to a transmitter and the transmitter adopts some transmitting precoding technologies according to the obtained channel information to greatly improve transmission performance. For single-user MIMO, a precoding vector relatively matched with channel characteristic vector information can be directly adopted for transmitting precoding. For multi-user MIMO, relatively accurate channel information is also needed for performing interference elimination. Therefore, channel information acquisition at a transmitter is very important.

In some 4G technology standard specifications such as Long Term Evolution/Long Term Evolution-Advanced (LTE/LTE-A) 802.16m, an ordinary flow for acquiring downlink channel information of a Frequency Division Duplexing (FDD) system is as follows.

S1: a transmitter (evolved Node B) transmits downlink Channel State Information-Reference Signals (CSI-RSs) to a receiver. Generally speaking, each antenna transmits one CSI-RS. Positions of the CSI-RSs transmitted by different antennae are staggered on time and frequency domains or on a code domain, which can keep orthogonality and avoid mutual interference. Each antenna corresponds to one CSI-RS port. The CSI-RSs are used for measuring channel information. In LTE-A, CSI-RS transmitting of maximally 8 antenna ports on an evolved Node B side is supported. The evolved Node B also transmits Radio Resource Control (RRC) signaling for configuring related position information and transmitting period information of the CSI-RSs to a terminal. Contents of the CSI-RSs transmitted by the evolved Node B side are determined by some predetermined rules, so that the terminal can accurately learn about the contents of the CSI-RSs transmitted by each port on the evolved Node B side at each time-frequency position.

S2: the terminal receives configuration information of the CSI-RSs from the evolved Node B side, and performs CSI-RS reception and detection at a transmitting time-frequency resource position of each pilot port notified by signaling. On a terminal side, each receiving antenna obtains the received CSI-RSs. Since the terminal and the evolved Node B have reached an agreement on the contents of the CSI-RSs transmitted at each time-frequency resource position of each transmitting port, the terminal can accurately learn about the downlink CSI-RSs. Further, the terminal can further perform downlink channel estimation according to the received CSI-RSs to obtain downlink channel response information between ports of the receiving antennae of the terminal side and ports of the transmitting antennae of the evolved Node B side. During downlink channel estimation, it is needed to consider influence of doping of noise and interference during practical pilot signal reception. In view of the above, channel estimation may be performed by adopting algorithms of Least Square (LS), Minimum Mean Square Error (MMSE), Interference Rejection Combining (IRC) and the like, so as to finally obtain a downlink channel matrix matched with the number of the transmitting ports at each time-frequency resource position.

S3: the terminal may estimate channel responses between receiving antennae and ports of multiple transmitting antennae according to the transmitting contents of the CSI-RSs of each pilot port and the received CSI-RSs on each receiving antenna. By virtue of the estimated channel responses, a channel matrix corresponding to each time-frequency resource position can be obtained, and optimal CSI can further be calculated according to the channel matrix. The CSI usually includes three types of information, i.e. Precoding Matrix Indicator/Channel Quality Indicator/Rank Indicator (PMI/CQI/RI) information. A precoding matrix, channel quality information and the number of transmission layers are fed back and recommended to the evolved Node B respectively. The terminal feeds back the calculated CQI/PMI/RI information to the evolved Node B through a control channel of an uplink physical layer or a data channel of the uplink physical layer. The evolved Node B determines the number of transmission layers, a coding and modulation scheme and transmitting precoding on the basis of the feedback information of the terminal.

It can be seen that a downlink CSI-RS plays a very important role in an acquisition process of CSI. The downlink CSI-RS usually influences accuracy of precoding information, channel quality information and the number of transmission layers, and further greatly influences transmission performance of MIMO.

In a 4G standard, all adopted downlink CSI-RS pilots are periodical CSI-RS pilots. On the time domain, considering that a change of a channel is not a sudden change but has a certain time-domain correlation and a correlation time is more than the duration of one subframe, i.e., 1 ms, not all subframes are required for transmitting the CSI-RS. All User Equipment (UE) can share CSI-RSs, so that the CSI-RSs are usually periodically transmitted. A concept of a periodical pilot is that an evolved Node B performs CSI-RS transmitting according to a certain periodical interval, and transmitting positions of the pilot may have different subframe position offsets. For example, a CSI-RS period and subframe offset in LTE-A are defined as follows.

Specifications regarding CSI-RS subframe configuration made in an LTE standard 36.211 are shown in the following table.

TABLE 1

| CSI-RS Subframe Configuration | | |
|---|---|---|
| CSI-RS-Subframe Config $I_{CSI-RS}$ | CSI-RS Periodicity $T_{CSI-RS}$ (subframes) | CSI-RS subframe offset $\Delta_{CSI-RS}$ (subframes) |
| 0-4 | 5 | $I_{CSI-RS}$ |
| 5-14 | 10 | $I_{CSI-RS}$-5 |

TABLE 1-continued

CSI-RS Subframe Configuration

| CSI-RS-Subframe Config $I_{CSI-RS}$ | CSI-RS Periodicity $T_{CSI-RS}$ (subframes) | CSI-RS subframe offset $\Delta_{CSI-RS}$ (subframes) |
|---|---|---|
| 15-34 | 20 | $I_{CSI-RS}$-15 |
| 35-74 | 40 | $I_{CSI-RS}$-35 |
| 75-154 | 80 | $I_{CSI-RS}$-75 |

In the table, $I_{CSI-RS}$ is a configuration parameter of a CSI-RS, and is valued within a range of 0-154. Different $I_{CSI-RS}$ values correspond to different periods and subframe offsets of the CSI-RS. FIG. 1 is a diagram of subframe positions for transmitting CSI-RS corresponding to a part of CSI-RS configuration examples, i.e. configurations corresponding to $I_{CSI-RS}$=0, $I_{CSI-RS}$=2 and $I_{CSI-RS}$=5 respectively.

In terms of frequency-domain position, CSI-RSs exist in each Physical Resource Block (PRB) pair, and the same transmitting pattern is adopted for the same port in different PRB pairs. A pattern of a CSI-RS is shown in FIG. 2. A PRB pair may refer to specifications in an LTE 36.211 protocol, and a typical condition includes 12 frequency-domain subcarriers and 14 time-domain Orthogonal Frequency Division Multiplexing (OFDM) symbols.

In an LTE system, it is defined that 40 Resource Elements (REs) in one PRB pair can be used for CSI-RSs. The 40 REs are divided into 5 patterns, each pattern including 8 REs, as shown in FIG. 2. Each port for CSI-RS pilots averagely occupies one RE in one PRB pair, and all ports belonging to the same CSI-RS resource are required to be limited in a pattern # i shown in FIG. 2. At present, a set of CSI-RSs supports maximally 8 ports, so that there are 5 candidate positions when the number of ports is 8, there are 10 configurable positions when the number of ports is 4, and there are 20 configurations when the number of ports is 2.

In an LTE-A system according to a related technology, precoding processing is usually not allowed when an evolved Node B transmits a CSI-RS pilot. This is mainly because multiple UEs in a cell share CSI-RS pilots, and if precoding is performed on the CSI-RS pilots, precoding can be performed only according to a characteristic of a channel from the evolved Node B to one UE, which may cause influence on measurement of the other UEs and disable the other UEs to accurately measure physical channels between Nr receiving antennae and Nr transmitting antennae, while performing precoding according to characteristics of channels of the other UEs may disable this UE to accurately calculate and report its own CSI. Of course, in a massive antenna communication system under discussion, when the number of antennae is very large, in order to save pilot overhead and reduce feedback complexity as much as possible, in some scenarios with relatively weak multipath scattering, an evolved Node B may also transmit a periodical precoded CSI-RS pilot, and such precoded CSI-RS is usually called as a beam measurement pilot. FIG. 3 is a transmitting strategy for a periodical beam pilot. Energy of each beam pilot is concentrated in a certain direction to form a directional beam. A beam measurement pilot is transmitted at an interval of a certain time period, and a group of beam pilots is polled.

Besides the periodical CSI-RS pilot described above, a non-periodical CSI-RS pilot is proposed recently. A non-periodical CSI-RS is an instantly triggered pilot. The non-periodical CSI-RS pilot is usually dynamically transmitted for channel measurement of specific UE or UE group. The non-periodical CSI-RS may not be continuously transmitted, and exists in only one subframe. Therefore, non-periodical pilot triggering information is carried in a Physical Downlink Control Channel (PDCCH) or an Enhanced-PDCCH (ePDCCH).

After learning about a transmitting position of a non-periodical CSI-RS, a terminal can perform pilot detection at the corresponding position. A transmitting content of the non-periodical CSI-RS may be pre-acquired by the terminal, like a periodical CSI-RS, so that a downlink channel response between a receiving antenna of the terminal and a transmitting antenna of an evolved Node B can be estimated to acquire a channel matrix.

There are two typical non-periodical pilot transmitting manners. One non-periodical pilot transmitting manner is to perform transmission in a Physical Downlink Shared Channel (PDSCH) of a user required to adopt a non-periodical CSI-RS for measurement. The other non-periodical pilot transmitting manner is to allocate a non-periodical CSI-RS competition resource pool of all users in a cell and then configure resources to different users on the basis of the resource pool. As shown in FIG. 4, the non-periodical CSI-RS competition resource pool may be transmitting resource positions of a set of periodical CSI-RSs.

It is noticed that a non-periodical CSI-RS is usually oriented to a specific user or a specific user group rather than all users in a cell. In view of this, the non-periodical CSI-RS may can a precoding method, the number of ports can be effectively reduced, and a calculated amount of CSI feedback can be further reduced. Therefore, the non-periodical CSI-RS may be selected to be transmitted either in a precoded beam pilot form or in a non-precoded non-beam pilot form according to a requirement.

There may be certain limits in the flexibility of transmitting of a periodical CSI-RS and non-periodical CSI-RS, no matter beam pilots or non-beam pilots, in the related technology. Specifically, the limits in the flexibility are reflected by the following aspects.

Flexibility limit (1): the numbers of ports and transmitting patterns in PRB pairs are the same.
  The number of CSI-RS pilot ports in a PRB pair a is the same as the number of CSI-RS pilot ports in a PRB pair b.
  Multiple pilot ports in the PRB pair a and the PRB pair b have the same transmitting resource densities (RE densities) in the respective PRB pairs.
  The multiple pilot ports in the PRB pair a and the PRB pair b have the same transmitting patterns in the respective PRB pairs (transmitting positions in the PRB pairs).

Flexibility limit (2): transmitting densities of all CSI-RS pilot ports are the same.
  A port i and a port j have the same pilot density in a PRB pair.
  A port i and a port j have the same transmitting PRB pair number density.
  A port i and a port j have the same transmitting PRB pair position.
  A port i and a port j have the same time-domain density (periodical configuration) and have the same subframe offset.

Flexibility limit (3): different subframes of periodical CSI-RS pilots have completely the same transmitting characteristics.
  Numbers of CSI-RS pilot ports and Identities (IDs) in a subframe m and a subframe n are the same.

CSI-RS pilots in the subframe m and the subframe n occupy the same number of REs in PRB pairs (resource densities in the PRB pairs are the same).

Numbers and densities of PRB pairs occupied by the CSI-RS pilots in the subframe m and the subframe n are the same.

The CSI-RS pilots in the subframe m and the subframe n occupy the same PRB pairs positions.

Service objects of CSI-RS pilots are diversified, channel fades corresponding to applied channels are also greatly different, interference environments and strength magnitudes are different, and meanwhile, different antenna topologies may exist on an evolved Node B side. As a result, adopting an inflexible CSI-RS design may implement design simplification, but cannot achieve high performance. The application performance of CSI-RS having a fixed transmitting parameter may not be high in a part of scenarios.

SUMMARY

The technical problem to be solved by the embodiments of the present disclosure is to provide a more flexible downlink pilot transmission solution.

In order to solve the problem, the following technical solutions are adopted.

A downlink pilot transmitting method may include that:

an evolved Node B divides resources for transmitting a downlink CSI-RS into multiple resource groups, wherein the resources may include any one or any combination of subframes, ports and PRB pairs;

the evolved Node B respectively configures a pilot transmitting parameter of each resource group, and/or respectively reaches an agreement with a terminal on the pilot transmitting parameter of each resource group; and the evolved Node B respectively transmits the downlink CSI-RS in the multiple resource groups according to the pilot transmitting parameter configured and/or as agreed with the terminal for each resource group.

Optionally, the resources may be multiple time-domain subframes for transmitting the downlink CSI-RS, the divided multiple resource groups may be subframe groups, and each subframe group may include one or more subframes; and the pilot transmitting parameter may include one or more of the following parameters:

a time-frequency resource density and time-frequency resource position occupied by the downlink CSI-RS, number of ports of the downlink CSI-RS, port IDs of the downlink CSI-RS, and transmitting power of the downlink CSI-RS.

Optionally, the time-frequency resource density may include a density of PRB pairs and/or a density of occupied REs in a PRB pair; and the time-frequency resource position may include positions of PRB pairs and/or patterns of occupied REs in a PRB pair.

Optionally, the resources may be multiple ports for transmitting the downlink CSI-RS, the divided multiple resource groups may be port groups, and each port group may include one or more ports; and the pilot transmitting parameter may include one or more of the following parameters:

a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, number of repeated transmitting times and transmitting time-domain position corresponding to the port if the downlink CSI-RS is a non-periodical pilot, and transmitting power of the downlink CSI-RS.

Optionally, the step that the evolved Node B divides the resources for transmitting the downlink CSI-RS into the multiple resource groups may include that:

the multiple ports for transmitting the downlink CSI-RS are divided into multiple port groups according to subframe numbers.

Optionally, the resources may be multiple frequency-domain PRB pairs for transmitting the downlink CSI-RS, the divided multiple resource groups may be Resource Block (RB) groups, and each RB group may include one or more PRB pairs; and the pilot transmitting parameter may include one or more of the following parameters:

a transmitting resource density of the downlink CSI-RS in an RB group, a transmitting resource position of the downlink CSI-RS in the RB group, number of transmitting resource ports of the downlink CSI-RSs in the RB group, port IDs of transmitting resource ports of the downlink CSI-RSs in the RB group, and transmitting power of the downlink CSI-RS.

Optionally, the step that the evolved Node B divides the resources for transmitting the downlink CSI-RSs into the multiple resource groups may include that:

the multiple frequency-domain PRB pairs for transmitting the downlink CSI-RS are divided into multiple RB groups according to subframe numbers.

Optionally, the resources may be any combinations of subframes, ports and PRB pairs, and each divided resource group may be an area; and the pilot transmitting parameter may include a transmitting position and/or transmitting density and/or transmitting power of the downlink CSI-RS.

Optionally, the method may further include that:

the evolved Node B notifies, through configuration signaling, the terminal of grouping information of the multiple resource groups, or reaches an agreement with the terminal on the grouping information of the multiple resource groups.

A downlink pilot detecting method may include that:

a terminal divides resources for transmitting a downlink CSI-RS into multiple resource groups according to configuration signaling of an evolved Node B and/or an agreement with the evolved Node B, wherein the resources may include any one or any combination of subframes, ports and PRB pairs;

the terminal determines a pilot transmitting parameter of each resource group; and the terminal detects the downlink CSI-RS according to the pilot transmitting parameter of each resource group.

Optionally, the resources may be multiple time-domain subframes for transmitting the downlink CSI-RS, the divided multiple resource groups may be subframe groups, and each subframe group may include one or more subframes; and the pilot transmitting parameter may include one or more of the following parameters:

a time-frequency resource density and time-frequency resource position occupied by the downlink CSI-RS,
number of ports of the downlink CSI-RS,
port IDs of the downlink CSI-RS, and
transmitting power of the downlink CSI-RS.

Optionally, the time-frequency resource density may include a density of PRB pairs and/or a density of occupied REs in a PRB pair; and the time-frequency resource position may include positions of PRB pairs and/or patterns of occupied REs in a PRB pair.

Optionally, the resources may be multiple ports for transmitting the downlink CSI-RS, the divided multiple resource groups may be port groups, and each port group may include one or more ports; and the pilot transmitting parameter may include one or more of the following parameters:

a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, number of repeated transmitting times and transmitting time-domain position corresponding to the port if the downlink CSI-RS is a non-periodical pilot, and transmitting power of the downlink CSI-RS.

Optionally, the step that the terminal divides the resources for transmitting the downlink CSI-RS into the multiple resource groups according to the configuration signaling of the evolved Node B and/or the agreement with the evolved Node B may include that:

the multiple ports for transmitting the downlink CSI-RS are divided into multiple port groups according to subframe numbers.

Optionally, the resources may be multiple frequency-domain PRB pairs for transmitting the downlink CSI-RS, the divided multiple resource groups may be RB groups, and each RB group may include one or more PRB pairs; and the pilot transmitting parameter may include one or more of the following parameters:

a transmitting resource density of the downlink CSI-RS in an RB group, a transmitting resource position of the downlink CSI-RS in the RB group, number of transmitting resource ports of the downlink CSI-RS in the RB group, port IDs of transmitting resource ports of the downlink CSI-RS in the RB group, and transmitting power of the downlink CSI-RS.

Optionally, the step that the terminal divides the resources for transmitting the downlink CSI-RS into the multiple resource groups according to the configuration signaling of the evolved Node B and/or the agreement with the evolved Node B may include that:

the multiple frequency-domain PRB pairs for transmitting the downlink CSI-RS are divided into multiple RB groups according to subframe numbers.

Optionally, the resources may be any combinations of subframes, ports and PRB pairs, and each divided resource group may be an area; and the pilot transmitting parameter may include a transmitting position and/or transmitting density and/or transmitting power of the downlink CSI-RS.

Optionally, the step that the terminal determines the pilot transmitting parameter of each resource group may include that:

the terminal determines the pilot transmitting parameter of each resource group according to configuration signaling from the evolved Node B.

A downlink pilot transmitting device may be arranged in an evolved Node B and include: a dividing module, a setting module and a transmitting module, wherein the dividing module may be arranged to divide resources for transmitting a downlink CSI-RS into multiple resource groups, wherein the resources may include any one or any combination of subframes, ports and PRB pairs;

the setting module may be arranged to respectively configure a pilot transmitting parameter of each resource group and/or respectively reach an agreement with a terminal on the pilot transmitting parameter of each resource group; and the transmitting module may be arranged to respectively transmit the downlink CSI-RS in each resource group according to the pilot transmitting parameter configured and/or as agreed with the terminal for each resource group.

Optionally, the resources may be multiple time-domain subframes for transmitting the downlink CSI-RS, the multiple resource groups divided by the dividing module may be subframe groups, and each subframe group may include one or more subframes; and the pilot transmitting parameter may include one or more of the following parameters:

a time-frequency resource density and time-frequency resource position occupied by the downlink CSI-RS,
number of ports of the downlink CSI-RS,
port IDs of the downlink CSI-RS, and
transmitting power of the downlink CSI-RS.

Optionally, the time-frequency resource density may include a density of PRB pairs and/or a density of occupied REs in a PRB pair; and the time-frequency resource position may include positions of PRB pairs and/or patterns of occupied REs in a PRB pair.

Optionally, the resources may be multiple ports for transmitting the downlink CSI-RS, the multiple resource groups divided by the dividing module may be port groups, and each port group may include one or more ports; and the pilot transmitting parameter may include one or more of the following parameters:

a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, number of repeated transmitting times and transmitting time-domain position corresponding to the port if the downlink CSI-RS is a non-periodical pilot, and transmitting power of the downlink CSI-RS.

Optionally, the dividing module may be arranged to divide the resources for transmitting the downlink CSI-RS into the multiple resource groups in the following manner:

dividing the multiple ports for transmitting the downlink CSI-RS into multiple port groups according to subframe numbers.

Optionally, the resources may be multiple frequency-domain PRB pairs for transmitting the downlink CSI-RS, the multiple resource groups divided by the dividing module may be RB groups, and each RB group may include one or more PRB pairs; and the pilot transmitting parameter may include one or more of the following parameters:

a transmitting resource density of the downlink CSI-RS in an RB group, a transmitting resource position of the downlink CSI-RS in the RB group, number of transmitting resource ports of the downlink CSI-RS in the RB group, port IDs of transmitting resource ports of the downlink CSI-RS in the RB group, and transmitting power of the downlink CSI-RS.

Optionally, the dividing module may be arranged to divide the resources for transmitting the downlink CSI-RS into the multiple resource groups in the following manner:

dividing the multiple frequency-domain PRB pairs for transmitting the downlink CSI-RS into multiple RB groups according to subframe numbers.

Optionally, the resources may be any combinations of subframes, ports and PRB pairs, and each resource group divided by the dividing module may be an area; and the pilot transmitting parameter may include a transmitting position and/or transmitting density and/or transmitting power of the downlink CSI-RS.

Optionally, the device may further include an agreement module, wherein the agreement module may be arranged to notify, through configuration signaling, the terminal of grouping information of the multiple resource groups, or reach an agreement with the terminal on the grouping information of the multiple resource groups.

A downlink pilot detecting device may be arranged in a terminal and include: a grouping module, a parameter determining module and a detecting module, wherein the grouping module may be arranged to divide resources for transmitting a downlink CSI-RS into multiple resource groups according to configuration signaling of an evolved Node B and/or an agreement with the evolved Node B, wherein the resources may include any one or any combination of subframes, ports and PRB pairs;

the parameter determining module may be arranged to determine a pilot transmitting parameter of each resource group; and the detecting module may be arranged to detect the downlink CSI-RS according to the pilot transmitting parameter of each resource group.

Optionally, the resources may be multiple time-domain subframes for transmitting the downlink CSI-RS, the multiple resource groups divided by the grouping module may be subframe groups, and each subframe group may include one or more subframes; and the pilot transmitting parameter may include one or more of the following parameters:

a time-frequency resource density and time-frequency resource position occupied by the downlink CSI-RS, number of ports of the downlink CSI-RS, port IDs of the downlink CSI-RS, and transmitting power of the downlink CSI-RS.

Optionally, the time-frequency resource density may include a density of PRB pairs and/or a density of occupied REs in a PRB pair; and the time-frequency resource position may include positions of PRB pairs and/or patterns of occupied REs in a PRB pair.

Optionally, the resources may be multiple ports for transmitting the downlink CSI-RS, the multiple resource groups divided by the grouping module may be port groups, and each port group may include one or more ports; and the pilot transmitting parameter may include one or more of the following parameters:

a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, number of repeated transmitting time and transmitting time-domain position corresponding to the port if the downlink CSI-RS is a non-periodical pilot, and transmitting power of the downlink CSI-RS.

Optionally, the grouping module may be arranged to divide the resources for transmitting the downlink CSI-RS into the multiple resource groups according to the configuration signaling of the evolved Node B and/or the agreement with the evolved Node B in the following manner:

dividing the multiple ports for transmitting the downlink CSI-RS into multiple port groups according to subframe numbers.

Optionally, the resources may be multiple frequency-domain PRB pairs for transmitting the downlink CSI-RS, the multiple resource groups divided by the grouping module may be RB groups, and each RB group may include one or more PRB pairs; and the pilot transmitting parameter may include one or more of the following parameters:

a transmitting resource density of the downlink CSI-RS in an RB group, a transmitting resource position of the downlink CSI-RS in the RB group, number of transmitting resource ports of the downlink CSI-RS in the RB group, port IDs of transmitting resource ports of the downlink CSI-RS in the RB group, and transmitting power of the downlink CSI-RS.

Optionally, the grouping module may be arranged to divide the resources for transmitting the downlink CSI-RS into the multiple resource groups according to the configuration signaling of the evolved Node B and/or the agreement with the evolved Node B in the following manner:

dividing the multiple frequency-domain PRB pairs for transmitting the downlink CSI-RS into multiple RB groups according to subframe numbers.

Optionally, the resources may be any combinations of subframes, ports and PRB pairs, and each resource group divided by the grouping module may be an area; and the pilot transmitting parameter may include a transmitting position and/or transmitting density and/or transmitting power of the downlink CSI-RS.

Optionally, the parameter determining module may be arranged to determine the pilot transmitting parameter of each resource group in the following manner:

the parameter determining module determines the pilot transmitting parameter of each resource group according to configuration signaling from the evolved Node B.

An evolved Node B may include any abovementioned downlink pilot transmitting device.

A terminal may include any abovementioned downlink pilot detecting device.

According to the technical solutions of the embodiments of the present disclosure, by grouping and respective setting of the pilot transmitting parameter for each group, a more flexible pilot transmission solution is provided, and pilot transmission patterns can be regulated to meet various requirements according to a practical condition during transmission.

DETAILED DESCRIPTION OF THE EMBODIMENTS

The technical solutions of the present disclosure will be described below with reference to the drawings and embodiments in more detail.

It is important to note that the embodiments of the present disclosure and each characteristic in the embodiments may be combined without conflicts and all combinations fall within the scope of protection of the present disclosure. In addition, although logical sequences are shown in the flowcharts, the shown or described steps may be executed in sequences different from the sequences shown here under some circumstances.

Figure 1:
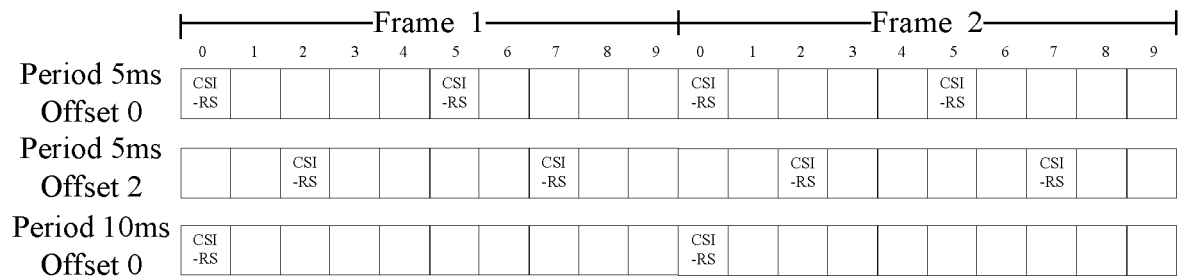
FIG. 1 is a diagram of subframe positions for transmitting CSI-RS corresponding to CSI-RS configuration examples.
Figure 2:
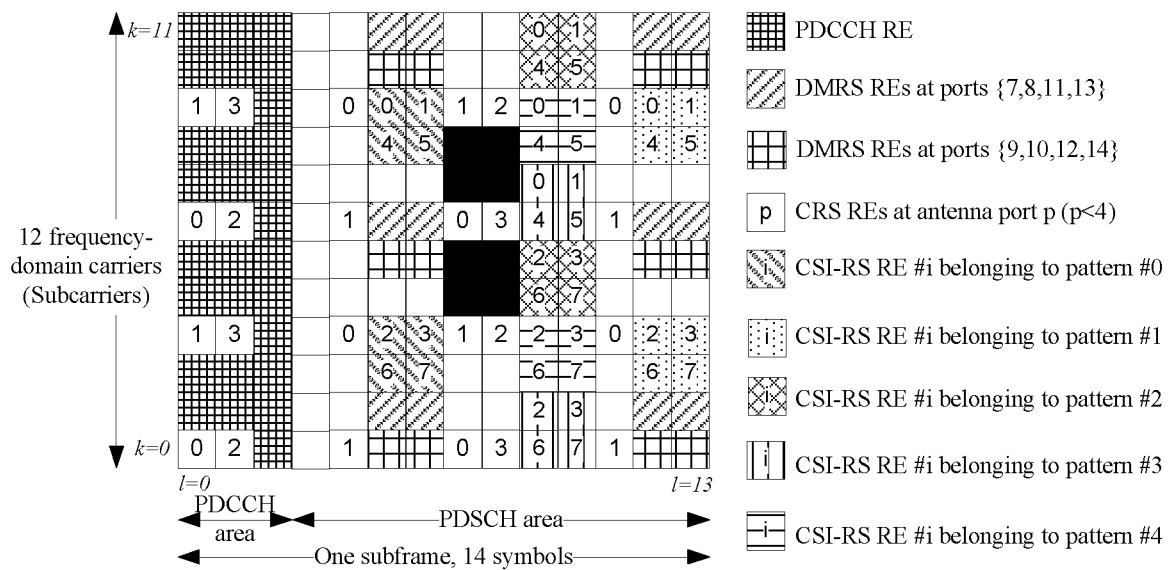
FIG. 2 is a schematic diagram of a CSI-RS pattern in LTE.
Figure 3:
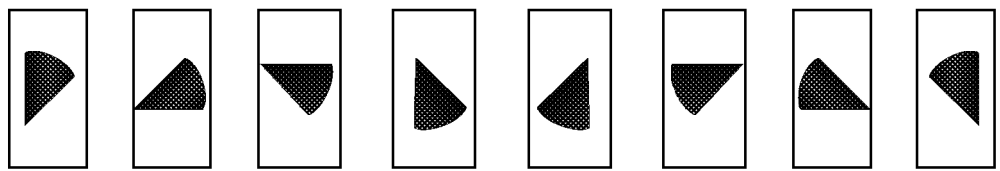
FIG. 3 is a schematic diagram of a periodical beam measurement pilot.
Figure 4:
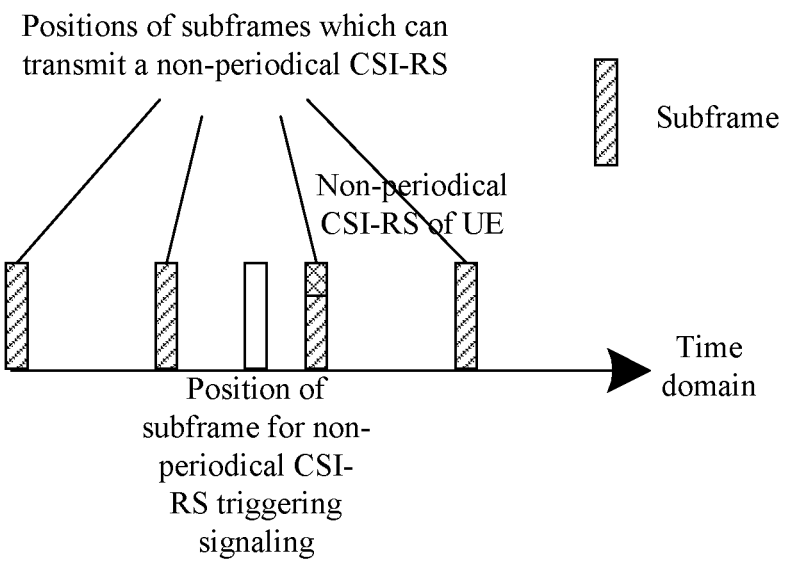
FIG. 4 is a diagram of time-frequency positions of non-periodical CSI-RSs.
Figure 5:
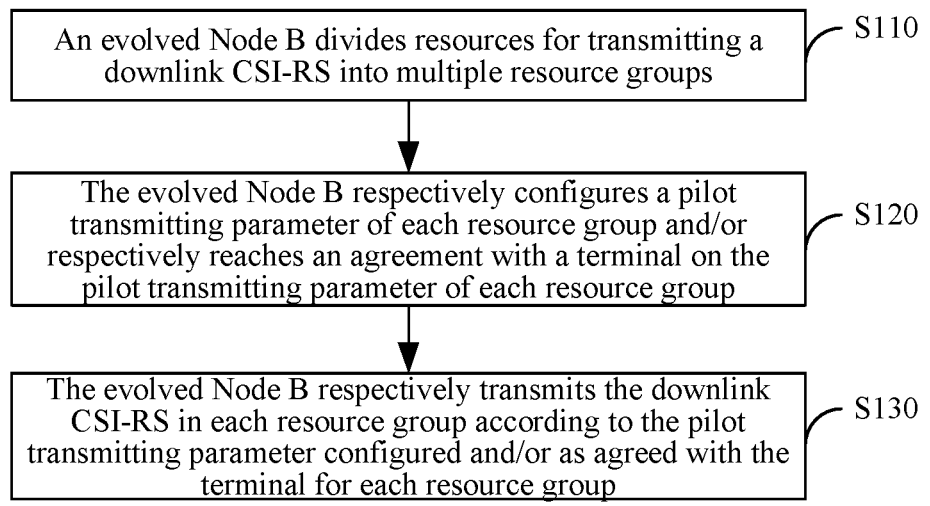
FIG. 5 is a flowchart of a downlink pilot transmitting method according to embodiment 1.

Embodiment 1: a downlink pilot transmitting method, as shown in FIG. 5, includes Steps S110~S130.

At step S110, an evolved Node B divides resources for transmitting a downlink CSI-RS into multiple resource groups, wherein the resources include any one or any combination of subframes, ports and PRB pairs.

At step S120, the evolved Node B respectively configures a pilot transmitting parameter of each resource group and/or respectively reaches an agreement with a terminal on the pilot transmitting parameter of each resource group.

At step S130, the evolved Node B respectively transmits the downlink CSI-RS in each resource group according to the pilot transmitting parameter configured and/or as agreed with the terminal for each resource group.

In the embodiment, the evolved Node B may notify, through configuration signaling, the terminal of grouping information of the multiple resource groups, or reach an agreement with the terminal on the grouping information of the multiple resource groups.

In an implementation mode of the embodiment, pilot parameter configuration is performed for time-domain subframes or subframe groups, the resources are M time-domain subframes for transmitting the downlink CSI-RS, and the divided multiple resource groups are subframe groups. In the implementation mode, the transmitting method specifically includes Steps S210~S230.

At step S210, the evolved Node B divides M subframes for transmitting the downlink CSI-RS into N subframe groups: a subframe group 1, a subframe group 2 . . . a subframe group N, wherein N is less than or equal to M, and each subframe group may include one or more subframes.

Furthermore, the evolved Node B may notify, through the signaling, the terminal of grouping information of the subframe groups, or reach an agreement with the terminal on the grouping information of the subframe groups.

At step S220, the evolved Node B respectively configures a pilot transmitting parameter of each subframe group for each subframe group, and/or respectively reaches an agreement with the terminal on the pilot transmitting parameter of each subframe group for each subframe group. The pilot transmitting parameter includes one or more of the following parameters:

(1) a time-frequency resource density and time-frequency resource position occupied by the downlink CSI-RS;

furthermore, the time-frequency resource density may include a density of PRB pairs and/or a density of occupied REs in a PRB pair;

furthermore, the time-frequency resource position may include positions of PRB pairs and/or positions (patterns) of occupied REs in a PRB pair.

(2) number of ports of the downlink CSI-RS;

(3) port IDs of the downlink CSI-RS; and (4) transmitting power of the downlink CSI-RS.

At step S230, the evolved Node B respectively transmits the downlink CSI-RS in each subframe group according to the pilot transmitting parameter of each subframe group configured and/or as agreed with the terminal for each subframe group.

In an implementation mode of the embodiment, pilot parameter configuration is performed for ports or port groups, the resources are Y ports for transmitting the downlink CSI-RS, and the divided multiple resource groups are port groups. In the implementation mode, the transmitting method specifically includes Steps S310~S330.

At step S310, the evolved Node B divides X ports for transmitting the downlink CSI-RS into Y port groups: a port group 1, a port group 2 . . . a port group Y, wherein Y is less than or equal to X, and each port group may include one or more ports.

Furthermore, the evolved Node B may notify, through the signaling, grouping information of the port groups, or reach an agreement with the terminal on the grouping information of the port groups.

Furthermore, division of the port groups may be determined according to subframe numbers.

At step S320, the evolved Node B respectively configures a pilot transmitting parameter of each port group for each port group, and/or respectively reaches an agreement with the terminal on the pilot transmitting parameter of each port group for each port group. The pilot transmitting parameter includes one or more of the following parameters:

(1) a density of time-frequency resources occupied by the downlink CSI-RS corresponding to a port, (2) a density of occupied PRB pairs corresponding to the port, (3) positions of the occupied PRB pairs corresponding to the port, (4) a transmitting density in each PRB pair corresponding to the port, (5) a transmitting position in each PRB pair corresponding to the port, (6) a transmitting period and offset corresponding to the port if the downlink CSI-RS is a periodical pilot, (7) number of repeated transmitting times and transmitting time-domain position corresponding to the port if the downlink CSI-RS is a non-periodical pilot, and (8) transmitting power of the downlink CSI-RS.

At step S330, the evolved Node B respectively transmits the downlink CSI-RS in each port group according to the pilot transmitting parameter of each port group configured and/or as agreed with the terminal for each port group.

In an implementation mode of the embodiment, pilot parameter configuration is performed for RBs or RB groups, the resources are Q frequency-domain PRB pairs for transmitting the downlink CSI-RS, and the divided multiple resource groups are RB groups. In the implementation mode, the transmitting method specifically includes Steps S410~S430.

At step S410, the evolved Node B divides Q frequency-domain PRB pairs for transmitting the downlink CSI-RS into P RB groups: an RB group 1, an RB group 2 . . . an RB group P, wherein P is less than or equal to Q, and each RB group may include one or more PRB pairs.

Furthermore, the evolved Node B may notify, through the signaling, the terminal of grouping information of the RB groups, or reach an agreement with the terminal on the grouping information of the RB groups.

Furthermore, division of the RB groups may be determined according to subframe numbers.

At step S420, the evolved Node B respectively configures a pilot transmitting parameter of each RB group for each RB group, and/or respectively reaches an agreement with the terminal on the pilot transmitting parameter of each RB group for each RB group. The pilot transmitting parameter includes one or more of the following parameters:

(1) a transmitting resource density of the downlink CSI-RS in an RB group, (2) a transmitting resource position of the downlink CSI-RS in the RB group, (3) number of transmitting resource ports of the downlink CSI-RS in the RB group, (4) port IDs of transmitting resource ports of the downlink CSI-RS in the RB group, and (5) transmitting power of the downlink CSI-RS.

At step S430, the evolved Node B respectively transmits the downlink CSI-RS in each RB group according to the pilot transmitting parameter of each RB group configured and/or as agreed with the terminal for each RB group.

In an implementation mode of the embodiment, the resources are any combinations of subframes, ports and PRB pairs, grouping of the implementation mode is multidimensional joint area division, and each divided resource group may be called as an area. In the implementation mode, the transmitting method specifically includes Steps S510~S530.

At step S510, the evolved Node B performs joint pattern area division on M ports, X subframe patterns and Q RB patterns for transmitting the downlink CSI-RS to obtain K transmitting areas;

or the evolved Node B performs joint pattern area division on X subframe patterns and Q RB patterns for transmitting the downlink CSI-RS to obtain K transmitting areas;

or the evolved Node B performs joint pattern area division on M ports and X subframe patterns for transmitting the downlink CSI-RS to obtain K transmitting areas;

or the evolved Node B performs joint pattern area division on M ports and Q RB patterns for transmitting the downlink CSI-RS to obtain K transmitting areas, the K transmitting areas being an area 1, an area 2 . . . an area K respectively.

Furthermore, the evolved Node B may notify, through the signaling, the terminal of grouping information of the areas, or reach an agreement with the terminal on the grouping information of the areas.

At step S520, the evolved Node B respectively configures a pilot transmitting parameter of each area for each area, and/or respectively reaches an agreement with the terminal on the pilot transmitting parameter of each area for each area. The pilot transmitting parameter includes a transmitting position and/or transmitting density and/or transmitting power of the downlink CSI-RS.

At step S530, the evolved Node B respectively transmits the downlink CSI-RS in each area according to the configured pilot transmitting parameters.

The embodiment will be specifically described below with some examples.

Example 1: Transmission Time Interval (TTI) Grouping for Respective Configuration of the Pilot Parameters, on an Evolved Node B Side Sub-example 1 of example 1: subframe grouping The evolved Node B divides M time-domain subframes for transmitting the downlink CSI-RS into N subframe groups: a subframe group 1, a subframe group 2 . . . a subframe group N, wherein N is less than or equal to M, and each subframe group may include one or more subframes.

(1) Condition of a periodical pilot

Figure 6A:
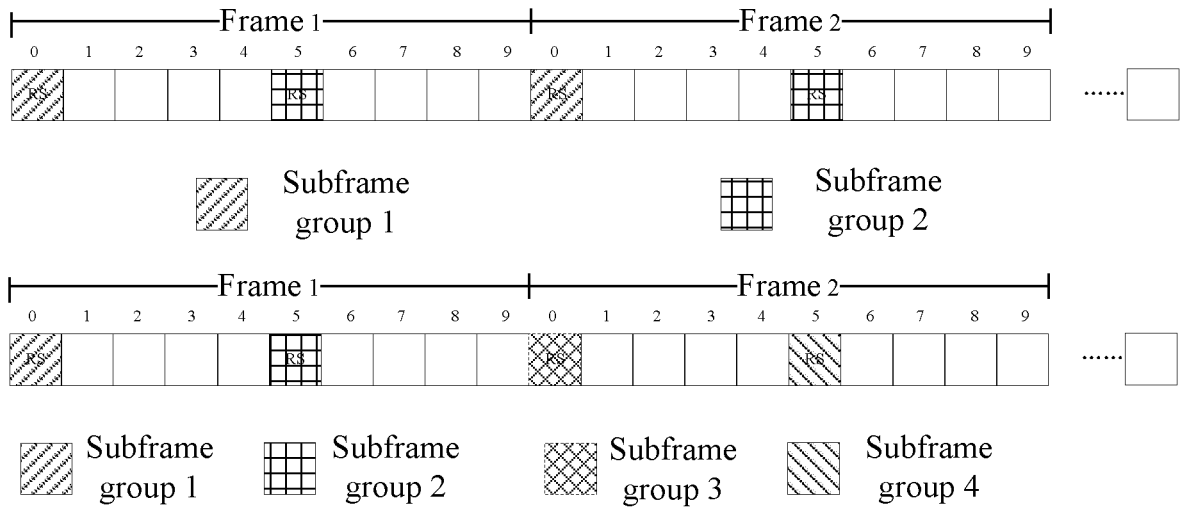
FIG. 6a is a schematic diagram of subframe grouping for periodical pilots in example 1 of embodiment 1.

The evolved Node B transmits the periodical pilot to the terminal. For the periodical pilot, the evolved Node B does not expect to limit all subframes which transmit the periodical pilot to have completely the same pilot transmitting parameter. Therefore, the evolved Node B groups the subframes, and some simple grouping methods are shown in FIG. 6a. One is to divide a subframe 0 in each frame into a subframe group 1 and divide a subframe 5 into a subframe group 2. The other is to divide the subframes 0 in odd frames into the subframe group 1, divide the subframes 5 into the subframe group 2, divide the subframes 0 in even frames into a subframe group 3 and divide the subframes 5 into a subframe group 4. During a practical application, how to group may be autonomously designed without limits of the example in FIG. 6a.

The evolved Node B may configure grouping information to the terminal through high-layer control signaling.

(2) Condition of a Non-Periodical Pilot

Figure 6B:
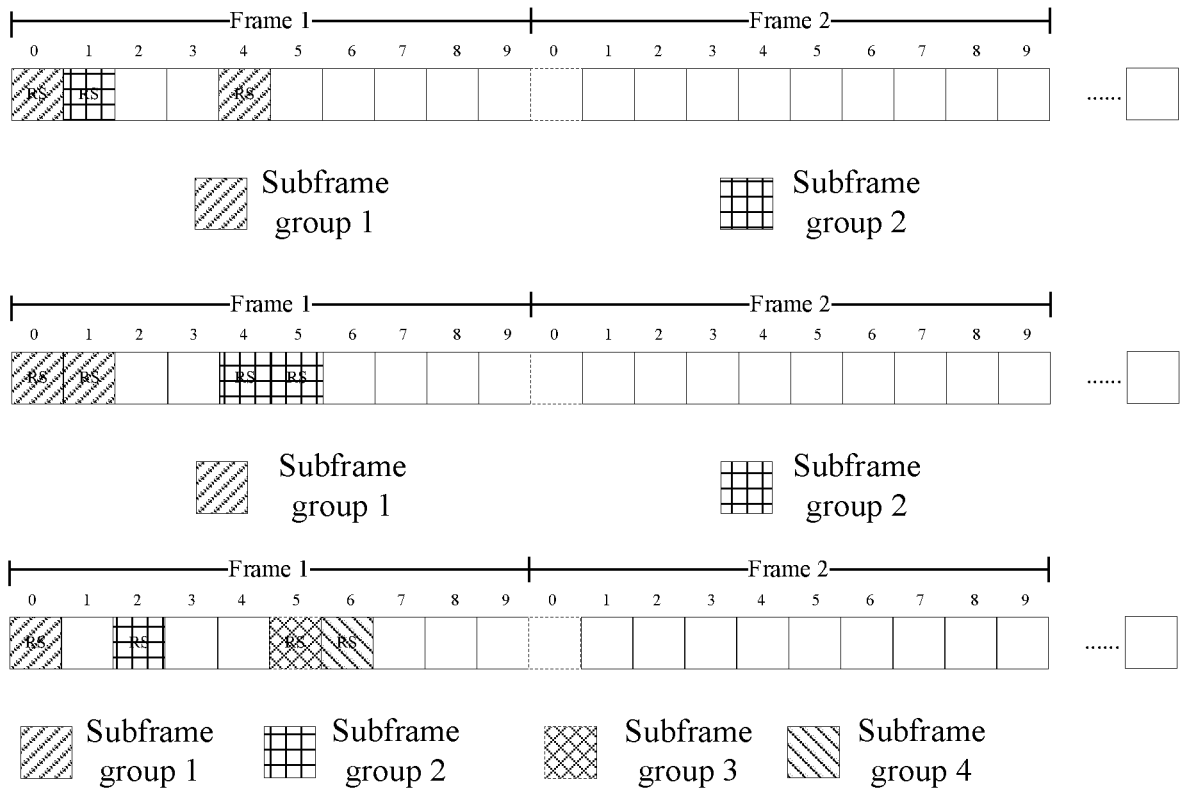
FIG. 6b is a schematic diagram of subframe grouping for non-periodical pilots in example 1 of embodiment 1.

The evolved Node B transmits a non-periodical CSI-RS to the terminal, non-periodical CSI-RS triggering signaling indicates non-periodical CSI-RS transmitting of multiple subframes, and the evolved Node B does not expect to limit all subframes which transmit the non-periodical pilot to have completely the same pilot transmitting parameter. Therefore, the evolved Node B groups multiple subframes, and some simple grouping methods are listed, as shown in FIG. 6b. One is to divide a subframe 0 and subframe 4 in odd frames into a subframe group 1 and divide subframes 2 into a subframe group 2. Another is to divide the subframe 0 and subframe 1 in the odd frames into the subframe group 1 and divide the subframes 4 and subframes 5 into the subframe group 2. Still another is to divide the subframes 0 in the odd frames into the subframe group 1, divide the subframes 2 into the subframe group 2, divide the subframes 5 into a subframe 3 and divide subframes 6 into a subframe 4. During a practical application, how to group may be autonomously designed without limits of the example in FIG. 6b.

The evolved Node B may configure grouping information to the terminal through physical-layer control signaling.

Or the evolved Node B and the terminal reach an agreement in advance on a corresponding subframe grouping method when the number of transmitting subframes of the non-periodical CSI-RS is M. Or the evolved Node B and the terminal reach an agreement in advance on a subframe grouping method associated with subframe IDs. For example, odd subframes are divided into a group and even subframes are divided into a group. For another example, subframes numbered to be Mod 4=0 are divided into a subframe group 1, subframes numbered to be Mod 4=1 are divided into a subframe group 2, subframes numbered to be Mod 4=2 are divided into a subframe group 3 and subframes numbered to be Mod 4=3 are divided into a subframe group 4.

Sub-Example 2 of Example 1: Pilot Transmitting Parameter Configuration of the Subframe Groups A method mainly presented in the example is to perform pilot transmitting parameter configuration on different subframe groups respectively, for example, as shown in the following tables.

TABLE 2

Pilot Transmitting PRB Pair Density Configuration

| | Subframe 1 | Subframe 2 | Subframe 3 | Subframe 4 |
|---|---|---|---|---|
| Density of PRB pair | 0.25 ¼ bandwidth | 0.5 ½ bandwidth | 1 Full bandwidth | 1 Full bandwidth |

Here, density of PRB pair refers to an RB number/full-bandwidth RB number, and is maximally 1.

TABLE 3

Pilot Transmitting PRB Pair Pattern of Each Subframe Group

| | Subframe 1 | Subframe 2 | Subframe 3 | Subframe 4 |
|---|---|---|---|---|
| Pattern of PRB pair | RB ID Mode4 = 0 | RB ID Mode2 = 1 | ALL RB | ALL RB |

TABLE 4

Pilot Density Configuration in PRB Pair of Each Subframe Group

| | Subframe 1 | Subframe 2 | Subframe 3 | Subframe 4 |
|---|---|---|---|---|
| Density of RE in PRB pair | 128 REs/RBs | 32 REs/RBs | 8 REs/RBs | 16 REs/RBs |

TABLE 5

Pilot Pattern Configuration in PRB Pair of Each Subframe Group

| | Subframe 1 | Subframe 2 | Subframe 3 | Subframe 4 |
|---|---|---|---|---|
| Pattern of RE in PRB pair | Pattern #1#2#3#4 | Pattern #1#3 | Pattern #3 | Pattern #2#4 |

Here, pattern # i is a pilot transmitting pattern pre-agreed by a transmitter and a receiver.

TABLE 6

CSI-RS Port Number Configuration of Each Subframe Group

| | Subframe 1 | Subframe 2 | Subframe 3 | Subframe 4 |
|---|---|---|---|---|
| CSI-RS port number | 32 | 16 | 8 | 8 |

TABLE 7

CSI-RS Port ID Configuration of Each Subframe Group

| | Subframe 1 | Subframe 2 | Subframe 3 | Subframe 4 |
|---|---|---|---|---|
| CSI-RS port ID | 0-31 | 16-31 | 0-7 | 8-15 |

TABLE 8

CSI-RS Relative Power Configuration of Each Subframe Group

|  | Subframe 1 | Subframe 2 | Subframe 3 | Subframe 4 |
|---|---|---|---|---|
| CSI-RS transmitting power (relative to power of data channel) | 6 dB | 3 dB | 3 dB | 0 dB |

Here, total power of the CSI-RS relative to power of a data channel is taken as an example, and a common hypothesis is that the power of the CSI-RS is averagely allocated between ports.

Sub-Example 3 of Example 1: Pilot Transmitting

The evolved Node B performs pilot transmitting in each subframe group according to the pilot transmitting parameter of each subframe group configured and/or as agreed with the terminal for each subframe group respectively.

For example, transmitting is performed in the subframe group 1 according to the following pilot parameter configuration.

TABLE 9

Pilot Transmitting Parameter of Subframe Group 1

|  | Density and pattern of PRB pair | Pattern and density in PRB pair | CSI-RS port ID | Relative power |
|---|---|---|---|---|
| Subframe 1 | RB ID Mode4 = 0 | Pattern #1#2#3#4 | 0-31 | 6 dB |

Transmitting is performed in the subframe group 2 according to the following pilot parameter configuration.

TABLE 10

Pilot Transmitting Parameter of Subframe Group 2

|  | Density and pattern of PRB pair | Pattern and density in PRB pair | CSI-RS port ID | Relative power |
|---|---|---|---|---|
| Subframe 2 | RB ID Mode2 = 1 | Pattern #1#3 | 16-31 | 3 dB |

Transmitting is performed in the subframe group 3 according to the following pilot parameter configuration.

TABLE 11

Pilot Transmitting Parameter of Subframe Group 3

|  | Density and pattern of PRB pair | Pattern and density in PRB pair | CSI-RS port ID | Relative power |
|---|---|---|---|---|
| Subframe 3 | ALL RBs | Pattern #3 | 0-7 | 3 dB |

Transmitting is performed in the subframe group 4 according to the following pilot parameter configuration.

TABLE 12

Pilot Transmitting Parameter of Subframe Group 4

|  | Density and pattern of PRB pair | Pattern and density in PRB pair | CSI-RS port ID | Relative power |
|---|---|---|---|---|
| Subframe 4 | RB ID Mode4 = 0 | Pattern #2#4 | 8-15 | 0 dB |

Example 2: Port Grouping for Respective Pilot Parameter Configuration, on the Evolved Node B Side Sub-Example 1 of Example 2: Port Grouping The evolved Node B divides X ports for transmitting the downlink CSI-RS into Y port groups: a port group 1, a port group 2 . . . a port group Y, wherein Y is less than or equal to X, and each port group may include one or more ports.

Some simple port grouping method examples are as follows.

Figure 7:
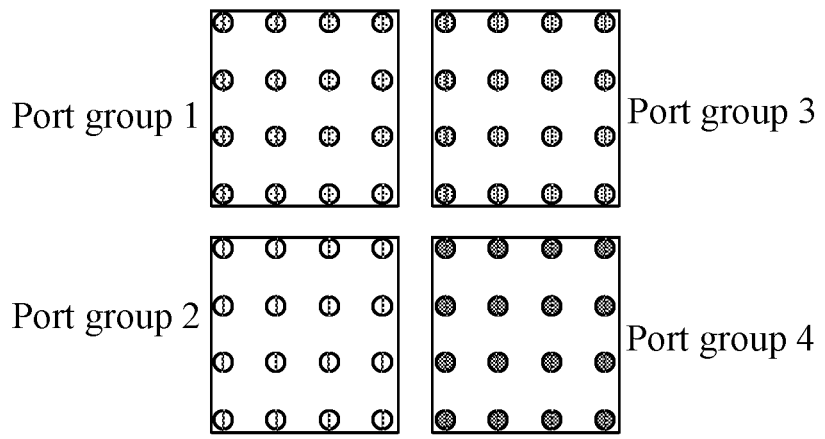
FIG. 7 is a schematic diagram of a port grouping method 1 in example 2 of embodiment 1.

Method 1: block grouping method, each block being divided into a group, as shown in FIG. 7.

Figure 8:
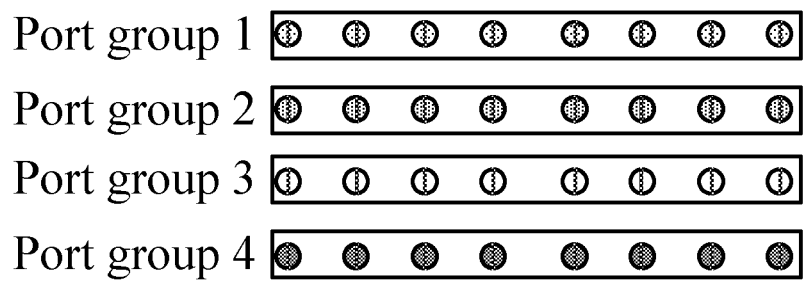
FIG. 8 is a schematic diagram of a port grouping method 2 in example 2 of embodiment 1.

Method 2: line grouping method, antenna ports of each line being divided into an antenna group, as shown in FIG. 8.

Figure 9:
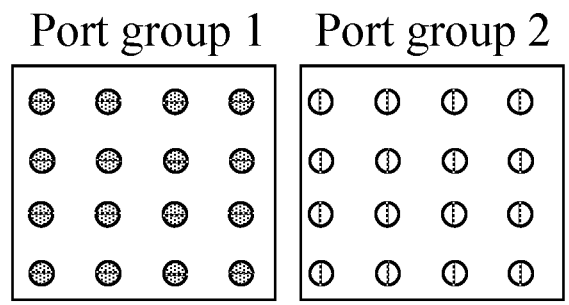
FIG. 9 is a schematic diagram of a port grouping method 3 in example 2 of embodiment 1.

Method 3: polarization grouping method, antenna ports in each polarization direction being divided into an antenna group, as shown in FIG. 9.

There are also some mixed grouping methods. For example, method 3 and method 1 are combined, and method 3 and method 1 are combined. During a practical application, how to group may be autonomously designed without limits to the examples.

The evolved Node B may configure grouping information of the ports to the terminal through physical-layer control signaling or configure the grouping information of the ports to the terminal through high-layer control signaling.

The evolved Node B may also reach an agreement with the terminal on the grouping information of the ports, and such an agreement may be determined according to an antenna topology, an antenna polarization condition and a total port number. Different antenna topologies, different total antenna numbers and different antenna polarization conditions determine grouping agreements with different targets respectively.

Sub-Example 2 of Example 2: Port Grouping for Pilot Transmitting Parameter Configuration A method mainly presented in the example is to perform pilot transmitting parameter configuration on different port groups respectively, for example, as shown in the following tables.

TABLE 13

Pilot Transmitting PRB Pair Density Configuration of Each Port Group

|  | Port group 1 | Port group 2 | Port group 3 | Port group 4 |
|---|---|---|---|---|
| Density of PRB pair | 0.25 ¼ bandwidth | 0.5 ½+12 bandwidth | 1 Full bandwidth | 1 Full bandwidth |

Here, density of PRB pair refers to a pilot transmitting RB number/full-bandwidth RB number, and is maximally 1.

TABLE 14

Pilot Transmitting PRB Pair Pattern of Each Port Group

|  | Port group 1 | Port group 2 | Port group 3 | Port group 4 |
|---|---|---|---|---|
| Pattern of PRB pair | RB ID Mode4 = 0 | RB ID Mode2 = 1 | ALL RB | ALL RB |

TABLE 15

Pilot Density Configuration in Pilot Transmitting PRB Pair of Each Port Group

|  | Port group 1 | Port group 2 | Port group 3 | Port group 4 |
|---|---|---|---|---|
| Density of RE in PRB pair | 4 REs/RBs | 2 REs/RBs | 1 RE/RB | 2 REs/RBs |

TABLE 16

Pilot Pattern Configuration in Pilot Transmitting PRB Pair of Each Port Group

|  | Port group 1 | Port group 2 | Port group 3 | Port group 4 |
|---|---|---|---|---|
| Pilot pattern in PRB pair | Pattern #1#2#3#4 | Pattern #1#3 | Pattern #3 | Pattern #2#4 |

TABLE 17

Configuration of Number of Repeated Pilot Transmitting Times of Each Port Group

|  | Port group 1 | Port group 2 | Port group 3 | Port group 4 |
|---|---|---|---|---|
| Number of repeated pilot transmitting times | 1 | 2 | 4 | 4 |

TABLE 18

Time-Domain Pilot Transmitting Pattern Configuration of Each Port Group

|  | Port group 1 | Port group 2 | Port group 3 | Port group 4 |
|---|---|---|---|---|
| Time-domain pilot transmitting pattern | Delay by 4 ms | Delay by 8 ms | Delay by 12 ms | Delay by 12 ms |

Here, delay may refer to a delay relative to a subframe pattern where the CSI-RS triggering signaling is located.

TABLE 19

Pilot Period Configuration of Each Port Group

|  | Port group 1 | Port group 2 | Port group 3 | Port group 4 |
|---|---|---|---|---|
| Pilot period | 10 | 20 | 40 | 80 |

TABLE 20

Pilot Transmitting Subframe Offset Configuration of Each Port Group

|  | Port group 1 | Port group 2 | Port group 3 | Port group 4 |
|---|---|---|---|---|
| Pilot period | 2 subframes | 2 subframes | 0 subframe | 0 subframe |

TABLE 21

CSI-RS Relative Power Configuration of Each Port Group

|  | Port group 1 | Port group 2 | Port group 3 | Port group 4 |
|---|---|---|---|---|
| CSI-RS transmitting power (relative to power of data channel) | −3 dB | 0 dB | 0 dB | 3 dB |

Here, CSI-RS total power of each port group relative to power of a data channel is taken as an example.

Sub-Example 3 of Example 2: Pilot Transmitting

The evolved Node B performs pilot transmitting in each port group according to the pilot transmitting parameter of each port group configured and/or as agreed with the terminal for each port group respectively.

For example, transmitting is performed in the port group 1 according to the following pilot parameter configuration.

TABLE 22

Pilot Transmitting Parameter of Port Group 1

|  | Density and pattern of PRB pair | Pattern and density in PRB pair | CSI-RS port period | Relative power |
|---|---|---|---|---|
| Port group 1 | RB ID Mode4 = 0 | Pattern #1#2#3#4 | 10 ms | −3 dB |

Transmitting is performed in the port group 2 according to the following pilot parameter configuration.

TABLE 23

Pilot Transmitting Parameter of Port Group 2

|  | Density and pattern of PRB pair | Pattern and density in PRB pair | CSI-RS port period | Relative power |
|---|---|---|---|---|
| Port group 2 | RB ID Mode2 = 1 | Pattern #1#3 | 20 ms | 0 dB |

Transmitting is performed in the port group 3 according to the following pilot parameter configuration.

TABLE 24

Pilot Transmitting Parameter of Port Group 3

|  | Density and pattern of PRB pair | Pattern and density in PRB pair | CSI-RS port period | Relative power |
|---|---|---|---|---|
| Port group 3 | ALL RBs | Pattern #3 | 40 ms | 0 dB |

Transmitting is performed in the port group 4 according to the following pilot parameter configuration.

TABLE 25

| | Pilot Transmitting Parameter of Port Group 4 | | | |
|---|---|---|---|---|
| | Density and pattern of PRB pair | Pattern and density in PRB pair | CSI-RS port period | Relative power |
| Port group 4 | RB ID Mode4 = 0 | Pattern #2#4 | 80 ms | 3 dB |

Example 3: RB Grouping for Respective Pilot Parameter Configuration, on the Evolved Node B Side

Sub-Example 1 of Example 3: RB Grouping Method

The evolved Node B divides Q frequency-domain PRB pairs for transmitting the downlink CSI-RS into P RB groups: an RB group 1, an RB group 2 . . . an RB group P, wherein P is less than or equal to Q, and each RB group may include one or more PRB pairs.

Figure 10:
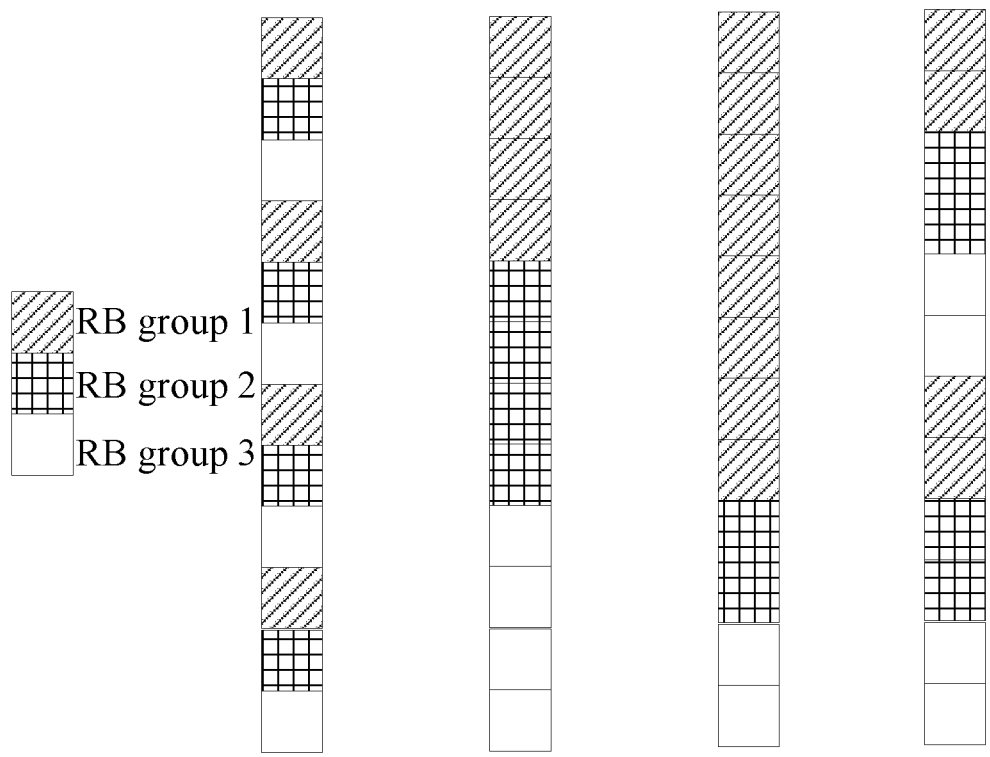
FIG. 10 is a schematic diagram of RB grouping in example 3 of embodiment 1.

Some simple grouping examples are shown in FIG. 10. For example, for division of three RB groups, one is to divide every three continuous RBs into RB groups 1, 2 and 3 (as shown in the first column from the left in FIG. 10), another is to divide all the RBs into the RB groups 1, 2 and 3 in each of which the RBs are continuous (as shown in the second column from the left in FIG. 10), another is that the RBs in each group are continuous but there are more RBs in the RB group 1 than the other two groups (as shown in the third column from the left in FIG. 10), and another is to divide every six continuous RBs into the RB groups 1, 2 and 3 respectively with each group including two continuous RBs (as shown in the first column from the right in FIG. 10). During a practical application, how to grouping may be autonomously designed without limits of the examples in FIG. 10.

The evolved Node B may notify the terminal of grouping information of the RBs through downlink physical-layer control signaling or high-layer configuration signaling. The evolved Node B may also reach some agreements with the terminal on the grouping information of the RBs.

Furthermore, RB grouping in each subframe may be different. That is, RB grouping in the subframes may be determined by combining subframe numbers.

Sub-Example 2 of Example 3: Pilot Transmitting Parameter Configuration of the RB Groups A method mainly presented in the example is to perform pilot transmitting parameter configuration on different RB groups respectively, for example, as shown in the following tables.

TABLE 26

| | Pilot Density Configuration in PRB Pair of Each RB Group | | | |
|---|---|---|---|---|
| | RB group 1 | RB group 2 | RB group 3 | RB group 4 |
| Density of RE in PRB pair | 128 REs/RBs | 32 REs/RBs | 16 RE/RB | 32 REs/RBs |

TABLE 27

| | Pilot Pattern Configuration in PRB Pair of Each RB Group | | | |
|---|---|---|---|---|
| | RB group 1 | RB group 2 | RB group 3 | RB group 4 |
| Pilot pattern in PRB pair | Pattern #1#2#3#4 | Pattern #1#3 | Pattern #2 | Pattern #2#4 |

TABLE 28

| | CSI-RS Port Number Configuration of Each RB Group | | | |
|---|---|---|---|---|
| | RB group 1 | RB group 2 | RB group 3 | RB group 4 |
| CSI-RS port number | 32 | 16 | 8 | 8 |

TABLE 29

| | CSI-RS Port ID Configuration of Each RB Group | | | |
|---|---|---|---|---|
| | Port group 1 | RB group 2 | RB group 3 | RB group 4 |
| CSI-RS port ID | 0-31 | 16-31 | 8-15 | 8-15 |

TABLE 30

| | CSI-RS Relative Power Configuration of Each RB Group | | | |
|---|---|---|---|---|
| | RB group 1 | RB group 2 | RB group 3 | RB group 4 |
| CSI-RS transmitting power (relative to power of data channel) | −3 dB | 0 dB | 0 dB | 3 dB |

Here, CSI-RS total power in each RB group relative to power of a data channel is taken as an example.

Sub-Example 3 of Example 3: Pilot Transmitting

The evolved Node B performs pilot transmitting in each RB group according to the pilot transmitting parameter of each RB group configured and/or as agreed with the terminal for each RB group respectively.

For example, transmitting is performed in the RB group 1 according to the following pilot parameter configuration.

TABLE 31

| | Pilot Transmitting Parameter of RB Group 1 | | |
|---|---|---|---|
| | Pattern and density in PRB pair | CSI-RS port ID | Relative power |
| RB group 1 | Pattern #1#2#3#4 | 0-31 | 6 dB |

Transmitting is performed in the RB group 2 according to the following pilot parameter configuration.

TABLE 32

Pilot Transmitting Parameter of RB Group 2

| | Pattern and density in PRB pair | CSI-RS port ID | Relative power |
|---|---|---|---|
| RB group 2 | Pattern #1#3 | 16-31 | 3 dB |

Transmitting is performed in the RB group 3 according to the following pilot parameter configuration.

TABLE 33

Pilot Transmitting Parameter of RB Group 3

| | Pattern and density in PRB pair | CSI-RS port ID | Relative power |
|---|---|---|---|
| RB group 3 | Pattern #3 | 0-7 | 3 dB |

Transmitting is performed in the RB group 4 according to the following pilot parameter configuration.

TABLE 34

Pilot Transmitting Parameter of RB Group 4

| | Pattern and density in PRB pair | CSI-RS port ID | Relative power |
|---|---|---|---|
| RB group 4 | Pattern #2#4 | 8-15 | 0 dB |

Example 4: Multidimensional Resource Area Division for Respective Pilot Parameter Configuration, on the Evolved Node B

Sub-Example 1 of Example 4: Two-Dimensional Resource Area Division Method 1

Figure 11:
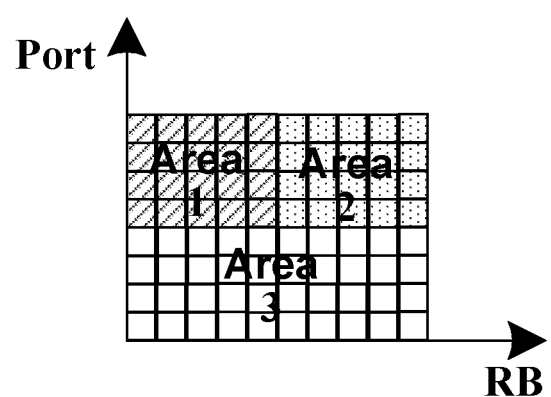
FIG. 11a and FIG. 11b are schematic diagrams of two division manners for a two-dimensional resource area division method 1 in example 4 of embodiment 1.
Figure 11:
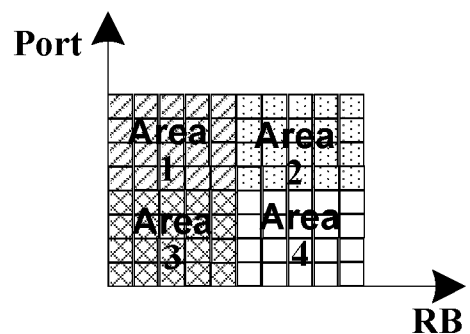

The method mainly performs pilot transmitting area division in two dimensions of port and RB, and does not perform area division in a subframe dimension. FIG. 11(a) and FIG. 11(b) show two simple division method examples, i.e. division of three areas and four areas respectively.

Sub-Example 2 of Example 4: Two-Dimensional Resource Area Division Method 2

Figure 12:
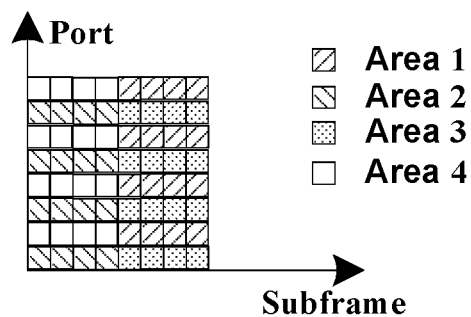
FIG. 12a and FIG. 12b are schematic diagrams of two division manners for a two-dimensional resource area division method 2 in example 4 of embodiment 1.
Figure 12:
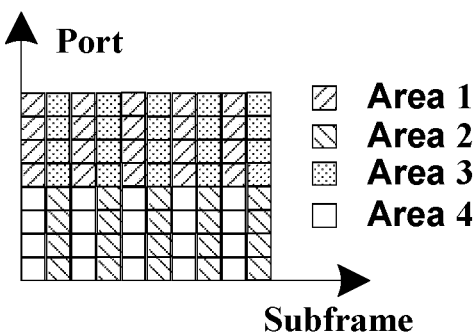

The method mainly performs pilot transmitting area division in the two dimensions of port and subframe, and does not perform area division in the RB dimension. FIG. 12(a) and FIG. 12(b) show two simple division method examples.

Sub-Example 3 of Example 4: Two-Dimensional Resource Area Division Method 3

Figure 13:
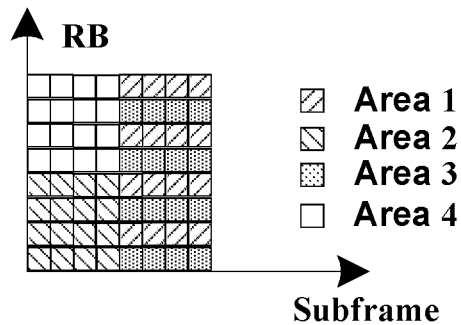
FIG. 13a and FIG. 13b are schematic diagrams of two division manners for a two-dimensional resource area division method 3 in example 4 of embodiment 1.
Figure 13:
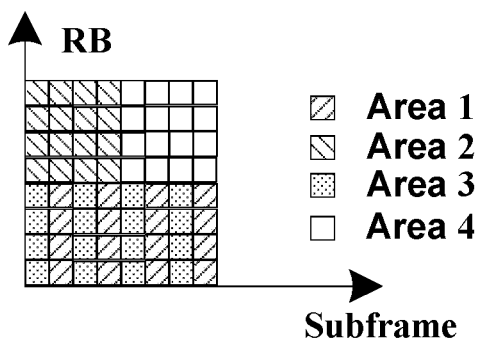

The method mainly performs pilot transmitting area division in the two dimensions of RB and subframe, and does not perform area division in the port dimension. FIG. 13(a) and FIG. 13(b) show two simple division method examples.

Figure 14:
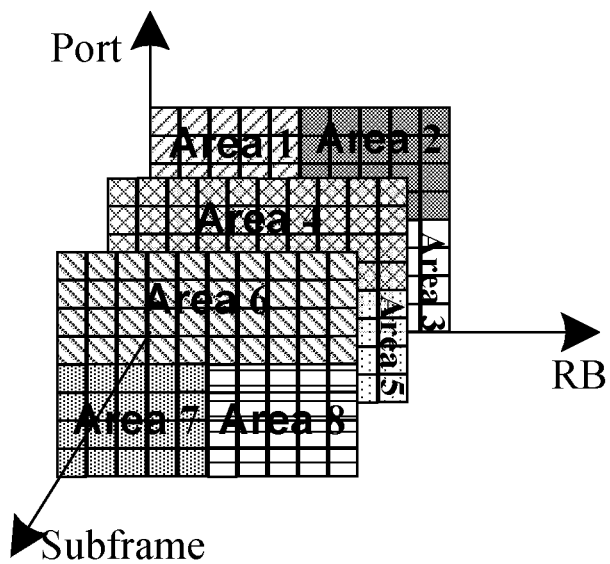
FIG. 14 is a schematic diagram of a three-dimensional resource area division method in example 4 of embodiment 1.
Figure 15:
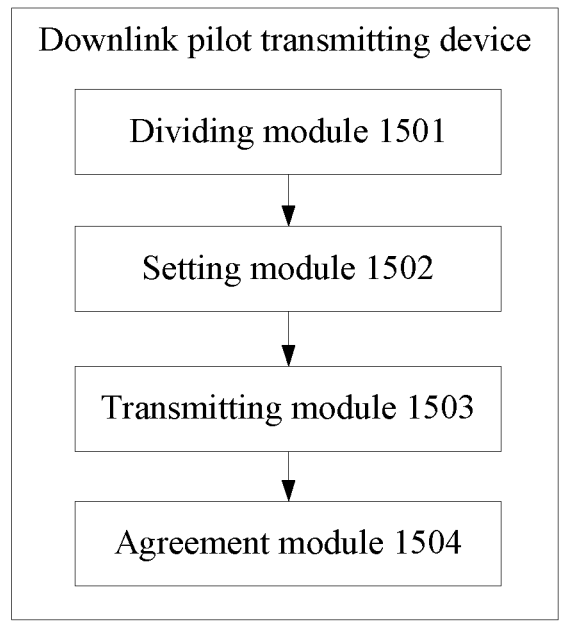
FIG. 15 is a structure diagram of a downlink pilot transmitting device according to an embodiment of the present disclosure.
Figure 16:
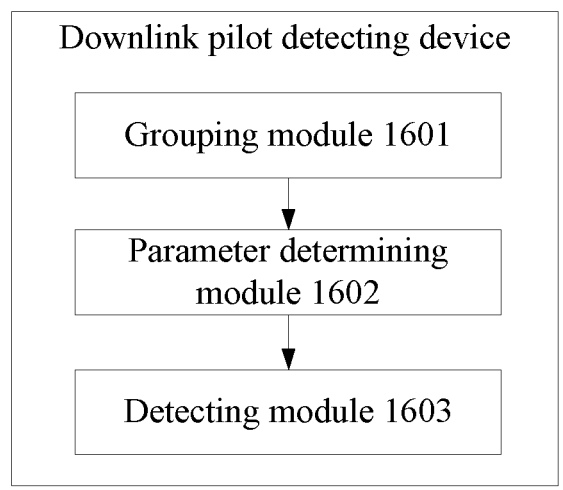
FIG. 16 is a structure diagram of a downlink pilot detecting device according to an embodiment of the present disclosure.

Sub-Example 4 of Example 4: Three-Dimensional Resource Area Division Method The method mainly performs pilot transmitting area division in the three dimensions of RB, subframe and port. FIG. 14 shows a simple division method example, and totally 8 areas are divided.

The evolved Node B may notify, through physical-layer control signaling or high-layer control signaling, grouping information of the areas, or reach an agreement with the terminal on the grouping information of the areas.

Sub-Example 5 of Example 4: Pilot Transmitting Parameter Configuration of Each Area

TABLE 35

Pilot Density Configuration in PRB Pair of Each Area Group

| | Area 1 | Area 2 | Area 3 | Area 4 |
|---|---|---|---|---|
| Density of RE in PRB pair | 128 REs/RBs | 32 REs/RBs | 16 REs/RBs | 32 REs/RBs |

TABLE 36

Pilot Pattern Configuration in PRB Pair of Each Area Group

| | Area 1 | Area 2 | Area 3 | Area 4 |
|---|---|---|---|---|
| Pilot pattern in PRB pair | Pattern #1#2#3#4 | Pattern #1#3 | Pattern #2 | Pattern #2#4 |

TABLE 37

CSI-RS Relative Power Configuration of Each Area Group

| | Area 1 | Area 2 | Area 3 | Area 4 |
|---|---|---|---|---|
| CSI-RS transmitting power (relative to power of data channel) | −3 dB | 0 dB | 0 dB | 3 dB |

Here, CSI-RS total power in each area relative to power of a data channel is taken as an example.

Finally, the evolved Node B performs pilot transmitting in each area according to the configured pilot transmitting position and/or transmitting density and/or transmitting power.

Embodiment 2: a downlink pilot detecting method includes Steps U110~130.

At step U110, a terminal divides resources for transmitting a downlink CSI-RS into multiple resource groups according to configuration signaling of an evolved Node B and/or an agreement with the evolved Node B, wherein the resources include any one or any combination of subframes, ports and PRB pairs.

At step U120, the terminal determines a pilot transmitting parameter of each resource group.

At step U130, the terminal detects the downlink CSI-RS according to the pilot transmitting parameter of each resource group.

In an implementation mode of the embodiment, the terminal may determine the pilot transmitting parameter of each resource group according to the configuration signaling of the evolved Node B in Step U120.

In an implementation mode of the embodiment, the resources are M time-domain subframes for transmitting the downlink CSI-RS, and the divided multiple resource groups are subframe groups. In the implementation mode, the detecting method specifically includes Steps U210~U230.

At step U210, the terminal divides the M subframes for transmitting the downlink CSI-RS into N subframe groups according to the configuration signaling of the evolved Node B and/or a method as agreed with the evolved Node B: a subframe group 1, a subframe group 2 . . . a subframe group N, wherein N is less than or equal to M, and each subframe group may include one or more subframes.

At step U220, the terminal determines a pilot transmitting parameter of each subframe group. The pilot transmitting parameter includes one or more of the following parameters:

(1) a time-frequency resource density and time-frequency resource position occupied by the downlink CSI-RS;

furthermore, the time-frequency resource density may include a density of PRB pairs and/or a density of occupied REs in a PRB pair;

furthermore, the time-frequency resource position may include positions of PRB pairs and/or positions (patterns) of occupied REs in a PRB pair.

(2) number of ports of the downlink CSI-RS;

(3) port IDs of the downlink CSI-RS; and (4) transmitting power of the downlink CSI-RS.

Furthermore, the terminal may determine the pilot transmitting parameter of each subframe group according to configuration signaling from the evolved Node B.

At step U230, the terminal detects the downlink CSI-RS according to the pilot transmitting parameter of each subframe group.

In an implementation mode of the embodiment, the resources are X ports for transmitting the downlink CSI-RS, and the divided multiple resource groups are port groups. In the implementation mode, the detecting method specifically includes Steps U310~U330.

At step U310, the terminal divides the X ports for transmitting the downlink CSI-RS into Y port groups according to the configuration signaling of the evolved Node B and/or the method as agreed with the evolved Node B: a port group 1, a port group 2 . . . a port group Y, wherein Y is less than or equal to X, and each port group may include one or more ports.

Furthermore, division of the port groups may be determined according to subframe numbers.

At step U320, the terminal determines a pilot transmitting parameter of each port group. The pilot transmitting parameter includes one or more of the following parameters:

(1) a density of time-frequency resources occupied by the downlink CSI-RS corresponding to a port, (2) a density of occupied PRB pairs corresponding to the port, (3) positions of the occupied PRB pairs corresponding to the port, (4) a transmitting density in each PRB pair corresponding to the port, (5) a transmitting position in each PRB pair corresponding to the port, (6) a transmitting period and offset corresponding to the port if the downlink CSI-RS is a periodical pilot, (7) the number of repeated transmitting times and transmitting time-domain position corresponding to the port if the downlink CSI-RS is a non-periodical pilot, and (8) transmitting power of the downlink CSI-RS.

Furthermore, the terminal may determine the pilot transmitting parameter of each port group according to configuration signaling from the evolved Node B.

At step U330, the terminal detects the downlink CSI-RS according to the pilot transmitting parameter of each port group.

In an implementation mode of the embodiment, the resources are Q frequency-domain PRB pairs for transmitting the downlink CSI-RS, and the divided multiple resource groups are RB groups. In the implementation mode, the detecting method specifically includes Steps U410~U430.

At step U410, the terminal divides the Q PRB pairs for transmitting the downlink CSI-RS into P RB groups according to the configuration signaling of the evolved Node B and/or the method as agreed with the evolved Node B: an RB group 1, an RB group 2 . . . an RB group P, wherein P is less than or equal to Q, and each RB group may include one or more PRB pairs.

Furthermore, division of the RB groups may be determined according to subframe numbers.

At step U420, the terminal determines a pilot transmitting parameter of each RB group. The pilot transmitting parameter includes one or more of the following parameters:

(1) a transmitting resource density of the downlink CSI-RS in an RB group, (2) a transmitting resource position of the downlink CSI-RS in the RB group, (3) number of transmitting resource ports of the downlink CSI-RS in the RB group, (4) port IDs of transmitting resource ports of the downlink CSI-RS in the RB group, and (5) transmitting power of the downlink CSI-RS.

Furthermore, the terminal may determine the pilot transmitting parameter of each RB group according to configuration signaling from the evolved Node B.

At step U430, the terminal detects the downlink CSI-RS in each RB group according to the pilot transmitting parameter of each RB group.

In an implementation mode of the embodiment, the resources are any combinations of subframes, ports and PRB pairs, grouping of the implementation mode is multidimensional joint area division, and each divided resource group may be called as an area. In the implementation mode, the detecting method specifically includes Steps U510~U530.

At step U510, the terminal performs joint pattern area division on M ports, X subframe patterns and Q RB patterns for transmitting the downlink CSI-RS to obtain K transmitting areas according to the configuration signaling of the evolved Node B and/or the method as agreed with the evolved Node B;

or the terminal performs joint pattern area division on M ports and X subframe patterns for transmitting the downlink CSI-RS to obtain K transmitting areas according to the configuration signaling of the evolved Node B and/or the method as agreed with the evolved Node B;

or the terminal performs joint pattern area division on X subframe patterns and Q RB patterns for transmitting the downlink CSI-RS to obtain K transmitting areas according to the configuration signaling of the evolved Node B and/or the method as agreed with the evolved Node B;

or the terminal performs joint pattern area division on M ports and Q RB patterns for transmitting the downlink CSI-RS to obtain K transmitting areas according to the configuration signaling of the evolved Node B and/or the method as agreed with the evolved Node B, the K transmitting areas being an area 1, an area 2 . . . an area K respectively.

At step U520, the terminal determines a pilot transmitting parameter of each area. The pilot transmitting parameter includes a transmitting position and/or transmitting density and/or transmitting power of the downlink CSI-RS.

At step U530, the terminal detects the downlink CSI-RS in each area according to the pilot transmitting parameter of each area.

The embodiment will be specifically described below with some examples.

Example 5: TTI Grouping for Respective Configuration of the Pilot Parameters, on a Terminal Side

Sub-Example 1 of Example 5: Acquisition of Grouping Information of Subframes The terminal divides M time-domain subframes for transmitting the downlink CSI-RS into N subframe groups according to the configuration signaling of the evolved Node B and/or the method as agreed with the evolved Node B: a subframe group 1, a subframe group 2 . . . a subframe group N, wherein N is less than or equal to M, and each subframe group may include one or more subframes.

The terminal may obtain the grouping information of the subframes by detecting physical-layer control signaling or high-layer signaling of the evolved Node B, thereby obtaining a total subframe group number, a subframe number of each subframe group and the like.

Or the evolved Node B and the terminal reach an agreement in advance on a corresponding subframe grouping method when the number of transmitting subframes of a non-periodical CSI-RS is M. Or the evolved Node B and the terminal reach an agreement in advance on a subframe grouping method associated with subframe IDs. For example, odd subframes are divided into a group and even subframes are divided into a group. For another example, subframes numbered to be Mod 4=0 are divided into a subframe group 1, subframes numbered to be Mod 4=1 are divided into a subframe group 2, subframes numbered to be Mod 4=2 are divided into a subframe group 3 and subframes numbered to be Mod 4=3 are divided into a subframe group 4.

The terminal obtains the grouping information of the subframes according to an agreed content.

Sub-Example 2 of Example 5: Pilot Parameter Information Acquisition of the Subframe Groups A method mainly presented in the example is that the terminal acquires various pilot transmitting parameter configurations of different subframe groups, for example, as shown in the following tables.

TABLE 38

Pilot Transmitting PRB Pair Density Configuration of Each Subframe Group

| | Subframe 1 | Subframe 2 | Subframe 3 | Subframe 4 |
|---|---|---|---|---|
| Density of PRB pair | 0.25 ¼ bandwidth | 0.5 ½ bandwidth | 1 Full bandwidth | 1 Full bandwidth |

Here, density of PRB pair refers to an RB number/full-bandwidth RB number, and is maximally 1.

TABLE 39

Pilot Transmitting PRB Pair Pattern Configuration of Each Subframe Group

| | Subframe 1 | Subframe 2 | Subframe 3 | Subframe 4 |
|---|---|---|---|---|
| Pattern of PRB pair | RB ID Mode4 = 0 | RB ID Mode2 = 1 | ALL RB | ALL RB |

TABLE 40

Pilot Density Configuration in PRB Pair of Each Subframe Group

| | Subframe 1 | Subframe 2 | Subframe 3 | Subframe 4 |
|---|---|---|---|---|
| Density of RE in PRB pair | 128 REs/RBs | 32 REs/RBs | 8 REs/RBs | 16 REs/RBs |

TABLE 41

Pilot Transmitting PRB Pair Pattern Configuration of Each Subframe Group

| | Subframe 1 | Subframe 2 | Subframe 3 | Subframe 4 |
|---|---|---|---|---|
| Pilot pattern in PRB pair | Pattern #1#2#3#4 | Pattern #1#3 | Pattern #3 | Pattern #2#4 |

Here, pattern # i is a pilot transmitting pattern pre-agreed by a transmitter and a receiver.

TABLE 42

Pilot Port Number Configuration of Each Subframe Group

| | Subframe 1 | Subframe 2 | Subframe 3 | Subframe 4 |
|---|---|---|---|---|
| CSI-RS port number | 32 | 16 | 8 | 8 |

TABLE 43

Pilot Port ID Configuration of Each Subframe Group

| | Subframe 1 | Subframe 2 | Subframe 3 | Subframe 4 |
|---|---|---|---|---|
| CSI-RS port ID | 0-31 | 16-31 | 0-7 | 8-15 |

TABLE 44

Pilot Relative Power Configuration of Each Subframe Group

| | Subframe 1 | Subframe 2 | Subframe 3 | Subframe 4 |
|---|---|---|---|---|
| CSI-RS transmitting power (relative to power of data channel) | 6 dB | 3 dB | 3 dB | 0 dB |

Here, total power of the CSI-RS relative to power of a data channel is taken as an example, and a common hypothesis is that the power of the CSI-RS is averagely allocated between ports.

Sub-Example 3 of Example 5: Pilot Detection in the Subframe Groups

Pilot detection is performed according to the determined pilot transmitting parameter (as a pilot detection parameter) in each subframe group.

For example, detection is performed in the subframe group 1 according to the following pilot parameter configuration.

TABLE 45

| | Pilot Detection Parameter of Subframe Group 1 | | | |
|---|---|---|---|---|
| | Density and pattern of PRB pair | Pattern and density in PRB pair | CSI-RS port ID | Relative power |
| Subframe 1 | RB ID Mode4 = 0 | Pattern #1#2#3#4 | 0-31 | 6 dB |

Detection is performed in the subframe group 2 according to the following pilot parameter configuration.

TABLE 46

| | Pilot Detection Parameter of Subframe Group 2 | | | |
|---|---|---|---|---|
| | Density and pattern of PRB pair | Pattern and density in PRB pair | CSI-RS port ID | Relative power |
| Subframe 2 | RB ID Mode2 = 1 | Pattern #1#3 | 16-31 | 3 dB |

Detection is performed in the subframe group 3 according to the following pilot parameter configuration.

TABLE 47

| | Pilot Detection Parameter of Subframe Group 3 | | | |
|---|---|---|---|---|
| | Density and pattern of PRB pair | Pattern and density in PRB pair | CSI-RS port ID | Relative power |
| Subframe 3 | ALL RBs | Pattern #3 | 0-7 | 3 dB |

Detection is performed in the subframe group 4 according to the following pilot parameter configuration.

TABLE 48

| | Pilot Transmitting Parameter of Subframe Group 4 | | | |
|---|---|---|---|---|
| | Density and pattern of PRB pair | Pattern and density in PRB pair | CSI-RS port ID | Relative power |
| Subframe 4 | RB ID Mode4 = 0 | Pattern #2#4 | 8-15 | 0 dB |

Example 6: Port Grouping for Respective Pilot Parameter Acquisition, on the Terminal Side Sub-Example 1 of Example 6: Acquisition of Grouping Information of Ports The terminal divides X ports for transmitting the downlink CSI-RS into Y port groups according to the configuration signaling of the evolved Node B and/or the method as agreed with the evolved Node B: a port group 1, a port group 2 . . . a port group Y, wherein Y is less than or equal to X, and each port group may include one or more ports.

The terminal may obtain the grouping information of the ports by detecting the physical-layer control signaling or high-layer signaling of the evolved Node B, thereby obtaining a total port group number, a port number of each port group and the like.

The terminal may also reach an agreement with the evolved Node B on the grouping information of the ports, and such an agreement may be determined according to an antenna topology, an antenna polarization condition and a total port number. Different antenna topologies, different total antenna numbers and different antenna polarization conditions determine grouping agreements with different targets respectively.

Sub-Example 2 of Example 6: Acquisition of Pilot Parameter Information of the Port Groups A method mainly presented in the example is to acquire pilot transmitting parameter configurations of different port groups respectively, for example, as shown in the following tables.

TABLE 49

| | Pilot Transmitting PRB Pair Density Configuration of Each Port Group | | | |
|---|---|---|---|---|
| | Port group 1 | Port group 2 | Port group 3 | Port group 4 |
| Density of PRB pair | 0.25 ¼ bandwidth | 0.5 ½ bandwidth | 1 Full bandwidth | 1 Full bandwidth |

Here, density of PRB pair refers to a pilot transmitting RB number/full-bandwidth RB number, and is maximally 1.

TABLE 50

| | Pilot Transmitting PRB Pair Pattern Configuration of Each Port Group | | | |
|---|---|---|---|---|
| | Port group 1 | Port group 2 | Port group 3 | Port group 4 |
| Pattern of PRB pair | RB ID Mode4 = 0 | RB ID Mode2 = 1 | ALL RB | ALL RB |

TABLE 51

| | Pilot Density Configuration in Pilot Transmitting PRB Pair of Each Port Group | | | |
|---|---|---|---|---|
| | Port group 1 | Port group 2 | Port group 3 | Port group 4 |
| Density of RE in PRB pair | 4 REs/RBs | 2 REs/RBs | 1 RE/RB | 2 REs/RBs |

TABLE 52

Pilot Pattern Configuration in Pilot Transmitting
PRB Pair of Each Port Group

|  | Port group 1 | Port group 2 | Port group 3 | Port group 4 |
|---|---|---|---|---|
| Pilot pattern in PRB pair | Pattern #1#2#3#4 | Pattern #1#3 | Pattern #3 | Pattern #2#4 |

TABLE 53

Configuration of Number of Repeated Pilot
Transmitting Times of Each Port Group

|  | Port group 1 | Port group 2 | Port group 3 | Port group 4 |
|---|---|---|---|---|
| Number of repeated pilot transmitting times | 1 | 2 | 4 | 4 |

TABLE 54

Time-Domain Pilot Transmitting Pattern
Configuration of Each Port Group

|  | Port group 1 | Port group 2 | Port group 3 | Port group 4 |
|---|---|---|---|---|
| Time-domain pilot transmitting pattern | Delay by 4 ms | Delay by 8 ms | Delay by 12 ms | Delay by 12 ms |

Here, delay may refer to a delay relative to a subframe pattern where CSI-RS triggering signaling is located.

TABLE 55

Pilot Period Configuration of Each Port Group

|  | Port group 1 | Port group 2 | Port group 3 | Port group 4 |
|---|---|---|---|---|
| Pilot period | 10 | 20 | 40 | 80 |

TABLE 56

Pilot Transmitting Subframe Offset
Configuration of Each Port Group

|  | Port group 1 | Port group 2 | Port group 3 | Port group 4 |
|---|---|---|---|---|
| Pilot period | 2 subframes | 2 subframes | 0 subframe | 0 subframe |

TABLE 57

CSI-RS Relative Power Configuration of Each Port Group

|  | Port group 1 | Port group 2 | Port group 3 | Port group 4 |
|---|---|---|---|---|
| CSI-RS transmitting power (relative to power of data channel) | −3 dB | 0 dB | 0 dB | 3 dB |

Here, CSI-RS total power of each port group relative to power of a data channel is taken as an example.

Sub-Example 3 of Example 6: Pilot Detection on
Each Port Group

Pilot detection is performed in each port group.
For example, detection is performed in the port group 1 according to the following pilot parameter configuration.

TABLE 58

Pilot Detection Parameter of Port Group 1

|  | Density and pattern of PRB pair | Pattern and density in PRB pair | CSI-RS port period | Relative power |
|---|---|---|---|---|
| Port group 1 | RB ID Mode4 = 0 | Pattern #1#2#3#4 | 10 ms | −3 dB |

Detection is performed in the port group 2 according to the following pilot parameter configuration.

TABLE 59

Pilot Detection Parameter of Port Group 2

|  | Density and pattern of PRB pair | Pattern and density in PRB pair | CSI-RS port period | Relative power |
|---|---|---|---|---|
| Port group 2 | RB ID Mode2 = 1 | Pattern #1#3 | 20 ms | 0 dB |

Detection is performed in the port group 3 according to the following pilot parameter configuration.

TABLE 60

Pilot Detection Parameter of Port Group 3

|  | Density and pattern of PRB pair | Pattern and density in PRB pair | CSI-RS port period | Relative power |
|---|---|---|---|---|
| Port group 3 | ALL RBs | Pattern #3 | 40 ms | 0 dB |

Detection is performed in the port group 4 according to the following pilot parameter configuration.

TABLE 61

Pilot Detection Parameter of Port Group 4

|  | Density and pattern of PRB pair | Pattern and density in PRB pair | CSI-RS port period | Relative power |
|---|---|---|---|---|
| Port group 4 | RB ID Mode4 = 0 | Pattern #2#4 | 80 ms | 3 dB |

Example 7: RB Grouping for Respective Pilot
Parameter Acquisition, on the Terminal Side Sub-Example 1 of Example 7: Acquisition of
Grouping Information of RBs The terminal divides Q frequency-domain PRB pairs for transmitting the downlink CSI-RS into P RB groups according to the configuration signaling of the evolved Node B and/or the method as agreed with the evolved Node B: an RB group 1, an RB group 2 . . . an RB group P, wherein P is less than or equal to Q, and each RB group may include one or more PRB pairs.

The terminal may obtain the grouping information of the RBs by detecting the physical-layer control signaling or high-layer signaling of the evolved Node B, thereby obtaining a total RB group number, an RB number of each RB group and the like.

The terminal may also reach an agreement with the evolved Node B on the grouping information of the RBs, and such an agreement may be determined according to an antenna topology, an antenna polarization condition and a total port number. Different antenna topologies, different total antenna numbers and different antenna polarization conditions determine RB grouping agreements with different targets respectively.

Furthermore, RB grouping in each subframe may be different. That is, RB grouping in the subframes may be determined by combining subframe numbers.

Sub-Example 2 of Example 7: Acquisition of Pilot Parameter Information of the RB Groups A method mainly presented in the example is to acquire pilot transmitting parameter configurations of different RB groups, for example, as shown in the following tables.

TABLE 62

Pilot Density Configuration in PRB Pair of Each RB Group

|  | RB group 1 | RB group 2 | RB group 3 | RB group 4 |
|---|---|---|---|---|
| Density of RE in PRB pair | 128 REs/RBs | 32 REs/RBs | 16 RE/RB | 32 REs/RBs |

TABLE 63

Pilot Pattern Configuration in PRB Pair of Each RB Group

|  | RB group 1 | RB group 2 | RB group 3 | RB group 4 |
|---|---|---|---|---|
| Pilot pattern in PRB pair | Pattern #1#2#3#4 | Pattern #1#3 | Pattern #2 | Pattern #2#4 |

TABLE 64

Pilot Port Number Configuration of Each RB Group

|  | RB group 1 | RB group 2 | RB group 3 | RB group 4 |
|---|---|---|---|---|
| CSI-RS port number | 32 | 16 | 8 | 8 |

TABLE 65

Pilot Port ID Configuration of Each RB Group

|  | Port group 1 | RB group 2 | RB group 3 | RB group 4 |
|---|---|---|---|---|
| CSI-RS port ID | 0-31 | 16-31 | 8-15 | 8-15 |

TABLE 66

Pilot Relative Power Configuration of Each RB Group

|  | RB group 1 | RB group 2 | RB group 3 | RB group 4 |
|---|---|---|---|---|
| CSI-RS transmitting power (relative to power of data channel) | −3 dB | 0 dB | 0 dB | 3 dB |

Here, CSI-RS total power in each RB group relative to power of a data channel is taken as an example.

Sub-Example 3 of Example 7: Pilot Detection in Each RB Group

The terminal performs pilot detection in each RB group according to each acquired pilot transmitting parameter.

For example, detection is performed in the RB group 1 according to the following pilot parameter configuration.

TABLE 67

Pilot Detection Parameter of RB Group 1

|  | Pattern and density in PRB pair | CSI-RS port ID | Relative power |
|---|---|---|---|
| RB group 1 | Pattern #1#2#3#4 | 0-31 | 6 dB |

Detection is performed in the RB group 2 according to the following pilot parameter configuration.

TABLE 68

Pilot Detection Parameter of RB Group 2

|  | Pattern and density in PRB pair | CSI-RS port ID | Relative power |
|---|---|---|---|
| RB group 2 | Pattern #1#3 | 16-31 | 3 dB |

Detection is performed in the RB group 3 according to the following pilot parameter configuration.

TABLE 69

Pilot Detection Parameter of RB Group 3

|  | Pattern and density in PRB pair | CSI-RS port ID | Relative power |
|---|---|---|---|
| RB group 3 | Pattern #3 | 0-7 | 3 dB |

Detection is performed in the RB group 4 according to the following pilot parameter configuration.

TABLE 70

Pilot Detection Parameter of RB Group 4

|  | Pattern and density in PRB pair | CSI-RS port ID | Relative power |
|---|---|---|---|
| RB group 4 | Pattern #2#4 | 8-15 | 0 dB |

Example 8: Multidimensional Area Grouping for Respective Pilot Parameter Acquisition, on the Terminal Side Sub-Example 1 of Example 8: Acquisition of Grouping Information of Areas The terminal performs joint pattern area division on M ports, X subframe patterns and Q RB patterns for transmitting the CSI-RS to obtain K transmitting areas according to the configuration signaling of the evolved Node B and/or the method as agreed with the evolved Node B: an area 1, an area 2 . . . an area K respectively.

Or

The terminal performs joint pattern area division on M ports and X subframe patterns for transmitting the CSI-RS to obtain K transmitting areas according to the configuration signaling of the evolved Node B and/or the method as agreed with the evolved Node B: an area 1, an area 2 . . . an area K respectively.

Or

The terminal performs joint pattern area division on X subframe patterns and Q RB patterns for transmitting the CSI-RS to obtain K transmitting areas according to the configuration signaling of the evolved Node B and/or the method as agreed with the evolved Node B: an area 1, an area 2 . . . an area K respectively.

Or

The terminal performs joint pattern area division on M ports and Q RB patterns for transmitting the CSI-RS to obtain K transmitting areas according to the configuration signaling of the evolved Node B and/or the method as agreed with the evolved Node B: an area 1, an area 2 . . . an area K respectively.

The terminal may obtain the grouping information of the areas by detecting the physical-layer control signaling or high-layer signaling of the evolved Node B, thereby obtaining a total area number, a definition of each area and the like.

The terminal may also reach an agreement with the evolved Node B on the grouping information of the areas, and such an agreement may be determined according to an antenna topology, an antenna polarization condition and a total port number. Different antenna topologies, different total antenna numbers and different antenna polarization conditions determine area grouping agreements with different targets respectively.

Sub-Example 2 of Example 8: Acquisition of Pilot Transmitting Parameter Configuration Information in the Areas

TABLE 71

Pilot Density Configuration in PRB Pair of Each Area

| | Area 1 | Area 2 | Area 3 | Area 4 |
|---|---|---|---|---|
| Density of RE in PRB pair | 128 REs/RBs | 32 REs/RBs | 16 REs/RBs | 32 REs/RBs |

TABLE 72

Pilot Pattern Configuration in PRB Pair of Each Area

| | Area 1 | Area 2 | Area 3 | Area 4 |
|---|---|---|---|---|
| Pilot pattern in PRB pair | Pattern #1#2#3#4 | Pattern #1#3 | Pattern #2 | Pattern #2#4 |

TABLE 73

Pilot Relative Power Configuration of Each Area

| | Area 1 | Area 2 | Area 3 | Area 4 |
|---|---|---|---|---|
| CSI-RS transmitting power (relative to power of data channel) | −3 dB | 0 dB | 0 dB | 3 dB |

Here, CSI-RS total power in each area relative to power of a data channel is taken as an example.

Finally, the terminal performs pilot detection in each area according to the configured pilot transmitting position and/or transmitting density and/or transmitting power.

Embodiment 3: a downlink pilot transmitting device is arranged in an evolved Node B, and includes:

a dividing module 1501, arranged to divide resources for transmitting a downlink CSI-RS into multiple resource groups, wherein the resources include any one or any combination of subframes, ports and PRB pairs;

a setting module 1502, arranged to respectively configure a pilot transmitting parameter of each resource group, and/or respectively reach an agreement with a terminal on the pilot transmitting parameter of each resource group; and a transmitting module 1503, arranged to respectively transmit the downlink CSI-RS in each resource group according to the pilot transmitting parameter configured and/or as agreed with the terminal for each resource group.

In an implementation mode of the embodiment, the resources are multiple time-domain subframes for transmitting the downlink CSI-RS, the multiple resource groups divided by the dividing module are subframe groups, and each subframe group includes one or more subframes; and the pilot transmitting parameter includes one or more of the following parameters:

a time-frequency resource density and time-frequency resource position occupied by the downlink CSI-RS,
  number of ports of the downlink CSI-RS,
  port IDs of the downlink CSI-RS, and
  transmitting power of the downlink CSI-RS.

In the implementation mode, the time-frequency resource density includes a density of PRB pairs and/or a density of occupied REs in a PRB pair; and the time-frequency resource position includes positions of PRB pairs and/or patterns of positions (occupied) REs in a PRB pair.

In an implementation mode of the embodiment, the resources are multiple ports for transmitting the downlink CSI-RS, the multiple resource groups divided by the dividing module are port groups, and each port group includes one or more ports; and the pilot transmitting parameter includes one or more of the following parameters:

a density of time-frequency resources occupied by the downlink CSI-RS corresponding to a port,
a density of occupied PRB pairs corresponding to the port,
positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, the number of repeated transmitting times and transmitting time-domain position corresponding to the port if the downlink CSI-RS is a non-periodical pilot, and transmitting power of the downlink CSI-RS.

In the implementation mode, the dividing module 1501 determines division of the port groups according to subframe numbers.

In an implementation mode of the embodiment, the resources are multiple frequency-domain PRB pairs for transmitting the downlink CSI-RS, the multiple resource groups divided by the dividing module are RB groups, and each RB group includes one or more PRB pairs; and the pilot transmitting parameter includes one or more of the following parameters:

a transmitting resource density of the downlink CSI-RS in an RB group, a transmitting resource position of the downlink CSI-RS in the RB group, number of transmitting resource ports of the downlink CSI-RS in the RB group, port IDs of transmitting resource ports of the downlink CSI-RS in the RB group, and transmitting power of the downlink CSI-RS.

In the implementation mode, the dividing module 1501 determines division of the RB groups according to subframe numbers.

In an implementation mode of the embodiment, the resources are any combinations of subframes, ports and PRB pairs, and each resource group divided by the dividing module 1501 is an area; and the pilot transmitting parameter includes a transmitting position and/or transmitting density and/or transmitting power of the downlink CSI-RS.

In an implementation mode of the embodiment, the device may further include:

an agreement module 1504, arranged to notify, through configuration signaling, the terminal of grouping information of the multiple resource groups, or reach an agreement with the terminal on the grouping information of the multiple resource groups.

Embodiment 4: a downlink pilot detecting device is arranged in a terminal and includes:

a grouping module 1601, arranged to divide resources for transmitting a downlink CSI-RS into multiple resource groups according to configuration signaling of an evolved Node B and/or an agreement with the evolved Node B, wherein the resources include any one or any combination of subframes, ports and PRB pairs;

a parameter determining module 1602, arranged to determine a pilot transmitting parameter of each resource group; and a detecting module 1603, arranged to detect the downlink CSI-RS according to the pilot transmitting parameter of each resource group.

In an implementation mode of the embodiment, the resources are multiple time-domain subframes for transmitting the downlink CSI-RS, the multiple resource groups divided by the grouping module are subframe groups, and each subframe group includes one or more subframes; and the pilot transmitting parameter includes one or more of the following parameters:

a time-frequency resource density and time-frequency resource position occupied by the downlink CSI-RS, number of ports of the downlink CSI-RS, port IDs of the downlink CSI-RS, and transmitting power of the downlink CSI-RS.

In the implementation mode, the time-frequency resource density includes a density of PRB pairs and/or a density of occupied REs in a PRB pair; and the time-frequency resource position includes positions of PRB pairs and/or positions (patterns) of occupied REs in a PRB pair.

In an implementation mode of the embodiment, the resources are multiple ports for transmitting the downlink CSI-RS, the multiple resource groups divided by the grouping module are port groups, and each port group includes one or more ports; and the pilot transmitting parameter includes one or more of the following parameters:

a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, the number of repeated transmitting time and transmitting time-domain position corresponding to the port if the downlink CSI-RS is a non-periodical pilot, and transmitting power of the downlink CSI-RS.

In the implementation mode, the grouping module 1601 determines division of the port groups according to subframe numbers.

In an implementation mode of the embodiment, the resources are multiple frequency-domain PRB pairs for transmitting the downlink CSI-RS, the multiple resource groups divided by the grouping module are RB groups, and each RB group includes one or more PRB pairs; and the pilot transmitting parameter includes one or more of the following parameters:

a transmitting resource density of the downlink CSI-RS in an RB group, a transmitting resource position of the downlink CSI-RS in the RB group, number of transmitting resource ports of the downlink CSI-RS in the RB group, port IDs of transmitting resource ports of the downlink CSI-RS in the RB group, and transmitting power of the downlink CSI-RS.

In the implementation mode, the grouping module 1601 determines division of the RB groups according to subframe numbers.

In an implementation mode of the embodiment, the resources are any combinations of subframes, ports and PRB pairs, and each resource group divided by the grouping module is an area; and the pilot transmitting parameter includes a transmitting position and/or transmitting density and/or transmitting power of the downlink CSI-RS.

In an implementation mode of the embodiment, that the parameter determining module 1602 determines the pilot transmitting parameter of each resource group refers to that:

the parameter determining module 1602 determines the pilot transmitting parameter of each resource group according to configuration signaling from the evolved Node B.

Embodiment 5: an evolved Node B includes the transmitting device of embodiment 3

Embodiment 6: a terminal includes the detecting device of embodiment 4.

Embodiment 7: the embodiment of the present disclosure discloses a computer program, which includes a program instruction, the program instruction being executed by an evolved Node B to enable the evolved Node B to execute any abovementioned downlink pilot transmitting device.

The embodiment of the present disclosure discloses a carrier carrying the computer program.

Embodiment 8: the embodiment of the present disclosure discloses a computer program, which includes a program instruction, the program instruction being executed by a terminal to enable the terminal to execute any abovementioned downlink pilot detecting device.

The embodiment of the present disclosure discloses a carrier carrying the computer program.

Of course, the present disclosure may further have many other embodiments, those skilled in the art may make various corresponding variations and transformations to the present disclosure without departing from the essence of the present disclosure, and these corresponding variations and transformations shall fall within the scope of protection of the claims of the present disclosure.

INDUSTRIAL APPLICABILITY

By the technical solutions of the embodiments of the present disclosure, a more flexible downlink pilot transmission solution is provided. Therefore, the technical solutions of the embodiments of the present disclosure have very high industrial practicability.

What is claimed is:

1. A downlink pilot transmitting method, comprising:
dividing, by an evolved Node B, resources for transmitting a downlink Channel State Information-Reference Signal (CSI-RS) into multiple resource groups, wherein the resources comprise any one or any combination of subframes, ports and Physical Resource Block (PRB) pairs;
respectively configuring a pilot transmitting parameter of each resource group and/or respectively reaching an agreement with a terminal on the pilot transmitting parameter of each resource group, by the evolved Node B; and
respectively transmitting, by the evolved Node B, the downlink CSI-RS in the multiple resource groups according to the pilot transmitting parameter configured and/or as agreed with the terminal for each resource group;
when the resources are multiple time-domain subframes for transmitting the downlink CSI-RS, the divided multiple resource groups are subframe groups, and each subframe group comprises one or more subframes; the pilot transmitting parameter comprises one or more of the following parameters: a time-frequency resource density and time-frequency resource position occupied by the downlink CSI-RS, number of ports of the downlink CSI-RS, port Identities (IDs) of the downlink CSI-RS, transmitting power of the downlink CSI-RS;
when the resources are multiple ports for transmitting the downlink CSI-RS, the divided multiple resource groups are port groups, and each port group comprises one or more ports; the pilot transmitting parameter comprises one or more of the following parameters: a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, number of repeated transmitting times and transmitting time-domain position corresponding to the port if the downlink CSI-RS is a non-periodical pilot, transmitting power of the downlink CSI-RS;
when the resources are multiple frequency-domain PRB pairs for transmitting the downlink CSI-RS, the divided multiple resource groups are Resource Block (RB) groups, and each RB group comprises one or more PRB pairs; the pilot transmitting parameter comprises one or more of the following parameters: a transmitting resource density of the downlink CSI-RS in an RB group, a transmitting resource position of the downlink CSI-RS in the RB group, number of transmitting resource ports of the downlink CSI-RSs in the RB group, port IDs of transmitting resource ports of the downlink CSI-RSs in the RB group, transmitting power of the downlink CSI-RS.

2. The downlink pilot transmitting method as claimed in claim 1, wherein
the time-frequency resource density comprises a density of PRB pairs and/or a density of occupied Resource Elements (REs) in a PRB pair; and
the time-frequency resource position comprises positions of PRB pairs and/or patterns of occupied REs in a PRB pair.

3. The downlink pilot transmitting method as claimed in claim 1, wherein dividing, by the evolved Node B, the resources for transmitting the downlink CSI-RS into the multiple resource groups comprises:
dividing the multiple ports for transmitting the downlink CSI-RS into multiple port groups according to subframe numbers.

4. The downlink pilot transmitting method as claimed in claim 1, wherein dividing, by the evolved Node B, the resources for transmitting the downlink CSI-RSs into the multiple resource groups comprises:
dividing the multiple frequency-domain PRB pairs for transmitting the downlink CSI-RS into multiple RB groups according to subframe numbers.

5. The downlink pilot transmitting method as claimed in claim 1, wherein
the resources are any combinations of subframes, ports and PRB pairs, and each divided resource group is an area; and the pilot transmitting parameter comprises a transmitting position and/or transmitting density and/or transmitting power of the downlink CSI-RS.

6. The downlink pilot transmitting method as claimed in claim 1, further comprising:
notifying, through configuration signaling, the terminal of grouping information of the multiple resource groups, or reaching an agreement with the terminal on the grouping information of the multiple resource groups, by the evolved Node B.

7. The downlink pilot transmitting method as claimed in claim 1, wherein the pilot transmitting parameter of at least one resource group is different from the pilot transmitting parameters of other resource groups.

8. The downlink pilot transmitting method as claimed in claim 1, wherein pilot transmitting parameters configured for different resource groups are different.

9. A downlink pilot detecting method, comprising:
dividing, by a terminal, resources for transmitting a downlink Channel State Information-Reference Signal (CSI-RS) into multiple resource groups according to configuration signaling of an evolved Node B and/or an agreement with the evolved Node B, wherein the resources comprise any one or any combination of subframes, ports and Physical Resource Block (PRB) pairs;
determining, by the terminal, a pilot transmitting parameter of each resource group; and
detecting, by the terminal, the downlink CSI-RS according to the pilot transmitting parameter of each resource group;
when the resources are multiple time-domain subframes for transmitting the downlink CSI-RS, the divided multiple resource groups are subframe groups, and each subframe group comprises one or more subframes; the pilot transmitting parameter comprises one or more of the following parameters: a time-frequency resource density and time-frequency resource position occupied by the downlink CSI-RS, number of ports of the downlink CSI-RS, port Identities (IDs) of the downlink CSI-RS, transmitting power of the downlink CSI-RS;
when the resources are multiple ports for transmitting the downlink CSI-RS, the divided multiple resource groups are port groups, and each port group comprises one or more ports; the pilot transmitting parameter comprises one or more of the following parameters: a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, number of repeated transmitting times and transmitting time-domain position corresponding to the port if the downlink CSI-RS is a non-periodical pilot, transmitting power of the downlink CSI-RS;
when the resources are multiple frequency-domain PRB pairs for transmitting the downlink CSI-RS, the divided multiple resource groups are Resource Block (RB) groups, and each RB group comprises one or more PRB pairs; the pilot transmitting parameter comprises one or more of the following parameters: a transmitting resource density of the downlink CSI-RS in an RB group, a transmitting resource position of the downlink CSI-RS in the RB group, number of transmitting resource ports of the downlink CSI-RSs in the RB group, port IDs of transmitting resource ports of the downlink CSI-RSs in the RB group, transmitting power of the downlink CSI-RS.

10. The downlink pilot detecting method as claimed in claim 9, wherein
the time-frequency resource density comprises a density of PRB pairs and/or a density of occupied Resource Elements (REs) in a PRB pair; and
the time-frequency resource position comprises positions of PRB pairs and/or patterns of occupied REs in a PRB pair.

11. The downlink pilot detecting method as claimed in claim 9, wherein dividing, by the terminal, the resources for transmitting the downlink CSI-RS into the multiple resource groups according to the configuration signaling of the evolved Node B and/or the agreement with the evolved Node B comprises:
dividing the multiple ports for transmitting the downlink CSI-RS into multiple port groups according to subframe numbers.

12. The downlink pilot detecting method as claimed in claim 9, wherein dividing, by the terminal, the resources for transmitting the downlink CSI-RS into the multiple resource groups according to the configuration signaling of the evolved Node B and/or the agreement with the evolved Node B comprises:
dividing the multiple frequency-domain PRB pairs for transmitting the downlink CSI-RS into multiple RB groups according to subframe numbers.

13. The downlink pilot detecting method as claimed in claim 9, wherein
the resources are any combinations of subframes, ports and PRB pairs, and each divided resource group is an area; and the pilot transmitting parameter comprises a transmitting position and/or transmitting density and/or transmitting power of the downlink CSI-RS.

14. The downlink pilot detecting method as claimed in claim 9, wherein determining, by the terminal, the pilot transmitting parameter of each resource group comprises:
determining, by the terminal, the pilot transmitting parameter of each resource group according to configuration signaling from the evolved Node B.

15. A downlink pilot transmitting device, arranged in an evolved Node B and comprising a hardware processor arranged to execute the following program modules: a dividing module, a setting module and a transmitting module, wherein
the dividing module is arranged to divide resources for transmitting a downlink Channel State Information-Reference Signal (CSI-RS) into multiple resource groups, wherein the resources comprise any one or any combination of subframes, ports and Physical Resource Block (PRB) pairs;
the setting module is arranged to respectively configure a pilot transmitting parameter of each resource group and/or respectively reach an agreement with a terminal on the pilot transmitting parameter of each resource group; and
the transmitting module is arranged to respectively transmit the downlink CSI-RS in each resource group according to the pilot transmitting parameter configured and/or as agreed with the terminal for each resource group;
when the resources are multiple time-domain subframes for transmitting the downlink CSI-RS, the divided multiple resource groups are subframe groups, and each subframe group comprises one or more subframes; the pilot transmitting parameter comprises one or more of the following parameters: a time-frequency resource density and time-frequency resource position occupied by the downlink CSI-RS, number of ports of the downlink CSI-RS, port Identities (IDs) of the downlink CSI-RS, transmitting power of the downlink CSI-RS;

when the resources are multiple ports for transmitting the downlink CSI-RS, the divided multiple resource groups are port groups, and each port group comprises one or more ports; the pilot transmitting parameter comprises one or more of the following parameters: a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, number of repeated transmitting times and transmitting time-domain position corresponding to the port if the downlink CSI-RS is a non-periodical pilot, transmitting power of the downlink CSI-RS;

when the resources are multiple frequency-domain PRB pairs for transmitting the downlink CSI-RS, the divided multiple resource groups are Resource Block (RB) groups, and each RB group comprises one or more PRB pairs; the pilot transmitting parameter comprises one or more of the following parameters: a transmitting resource density of the downlink CSI-RS in an RB group, a transmitting resource position of the downlink CSI-RS in the RB group, number of transmitting resource ports of the downlink CSI-RSs in the RB group, port IDs of transmitting resource ports of the downlink CSI-RSs in the RB group, transmitting power of the downlink CSI-RS.

16. An evolved Node B, comprising the downlink pilot transmitting device as claimed in claim 15.

17. A downlink pilot detecting device, arranged in a terminal and comprising a hardware processor arranged to execute the following program modules: a grouping module, a parameter determining module and a detecting module, wherein the grouping module is arranged to divide resources for transmitting a downlink Channel State Information-Reference Signal (CSI-RS) into multiple resource groups according to configuration signaling of an evolved Node B and/or an agreement with the evolved Node B, wherein the resources comprise any one or any combination of subframes, ports and Physical Resource Block (PRB) pairs;

the parameter determining module is arranged to determine a pilot transmitting parameter of each resource group; and the detecting module is arranged to detect the downlink CSI-RS according to the pilot transmitting parameter of each resource group;

when the resources are multiple time-domain subframes for transmitting the downlink CSI-RS, the divided multiple resource groups are subframe groups, and each subframe group comprises one or more subframes; the pilot transmitting parameter comprises one or more of the following parameters: a time-frequency resource density and time-frequency resource position occupied by the downlink CSI-RS, number of ports of the downlink CSI-RS, port Identities (IDs) of the downlink CSI-RS, transmitting power of the downlink CSI-RS;

when the resources are multiple ports for transmitting the downlink CSI-RS, the divided multiple resource groups are port groups, and each port group comprises one or more ports; the pilot transmitting parameter comprises one or more of the following parameters: a density of time-frequency resources occupied by the downlink CSI-RS corresponding to a port, a density of occupied PRB pairs corresponding to the port, positions of the occupied PRB pairs corresponding to the port, a transmitting density in each PRB pair corresponding to the port, a transmitting position in each PRB pair corresponding to the port, a transmitting period and offset corresponding to the port if the downlink CSI-RS is a periodical pilot, number of repeated transmitting times and transmitting time-domain position corresponding to the port if the downlink CSI-RS is a non-periodical pilot, transmitting power of the downlink CSI-RS;

when the resources are multiple frequency-domain PRB pairs for transmitting the downlink CSI-RS, the divided multiple resource groups are Resource Block (RB) groups, and each RB group comprises one or more PRB pairs; the pilot transmitting parameter comprises one or more of the following parameters: a transmitting resource density of the downlink CSI-RS in an RB group, a transmitting resource position of the downlink CSI-RS in the RB group, number of transmitting resource ports of the downlink CSI-RSs in the RB group, port IDs of transmitting resource ports of the downlink CSI-RSs in the RB group, transmitting power of the downlink CSI-RS.

18. A terminal, comprising the downlink pilot detecting device as claimed in claim 17.

\* \* \* \* \*